US010038764B2

(12) United States Patent
Liu et al.

(10) Patent No.: US 10,038,764 B2
(45) Date of Patent: Jul. 31, 2018

(54) DATA TRANSMISSION METHOD AND APPARATUS

(71) Applicant: Huawei Technologies Co., Ltd., Shenzhen (CN)

(72) Inventors: Yalin Liu, Shanghai (CN); Jiayin Zhang, Shanghai (CN); Yi Luo, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 168 days.

(21) Appl. No.: 14/972,989

(22) Filed: Dec. 17, 2015

(65) Prior Publication Data

US 2016/0105536 A1   Apr. 14, 2016

Related U.S. Application Data

(63) Continuation of application No. PCT/CN2013/078133, filed on Jun. 27, 2013.

(51) Int. Cl.
*H04L 29/06* (2006.01)
*H04L 25/02* (2006.01)
(Continued)

(52) U.S. Cl.
CPC ............. *H04L 69/22* (2013.01); *H04L 5/005* (2013.01); *H04L 25/0202* (2013.01);
(Continued)

(58) Field of Classification Search
CPC ..... H04L 5/005; H04L 25/0202; H04L 69/22; H04L 25/0226; H04L 5/0007;
(Continued)

(56) References Cited

U.S. PATENT DOCUMENTS

2006/0007891 A1   1/2006   Aoki et al.
2009/0028106 A1   1/2009   Hansen et al.
(Continued)

FOREIGN PATENT DOCUMENTS

CN   1708036 A   12/2005
CN   001738311 A   2/2006
(Continued)

OTHER PUBLICATIONS

IEEE, "Part 11: Wireless LAN Medium Access Control (MAC) and Physical Layer (PHY) Specifications," IEEE Standard for Information Technology, Telecommunications and Information Exchange Between Systems, Local and Metropolitan Area Networks, Specific Requirements, IEEE Std. 802.11-2012, Revision of IEEE Std. 802.11-2007, Mar. 29, 2012, 2793 pages.

(Continued)

*Primary Examiner* — Pao Sinkantarakorn
(74) *Attorney, Agent, or Firm* — Slater Matsil, LLP

(57) ABSTRACT

A data transmission method includes determining, by a transmitting device, a long training sequence set, where the long training sequence set includes a plurality of long training sequences. The method also includes determining a mapping relationship between each long training sequence in the long training sequence set and first sub-identity information in identity information of each receiving device in a communications system. When data needs to be transmitted to a target receiving device, the method includes selecting a target long training sequence from the long training sequence set according to first sub-identity information of the target receiving device and the mapping relationship. The method includes performing encapsulation processing on the data according to the target long training sequence to generate a data packet, so as to carry the target long training sequence in the data packet. The method (Continued)

includes sending the data packet to the target receiving device.

20 Claims, 5 Drawing Sheets

(51) Int. Cl.
*H04L 5/00* (2006.01)
*H04W 72/04* (2009.01)
*H04L 27/26* (2006.01)

(52) U.S. Cl.
CPC ...... *H04L 25/0226* (2013.01); *H04L 27/2613* (2013.01); *H04W 72/04* (2013.01)

(58) Field of Classification Search
CPC .......................... H04L 5/0048–5/0051; H04L 27/261–27/2613; H04L 27/262; H04W 72/04
See application file for complete search history.

(56) References Cited

U.S. PATENT DOCUMENTS

| | | | |
|---|---|---|---|
| 2011/0142020 A1 | 6/2011 | Kang et al. | |
| 2011/0211594 A1 | 9/2011 | Van Nee | |
| 2011/0222393 A1 | 9/2011 | Kwak et al. | |
| 2013/0272198 A1* | 10/2013 | Azizi | H04W 72/02 370/328 |
| 2014/0315507 A1* | 10/2014 | Thompson | H04B 7/2125 455/150.1 |
| 2015/0124794 A1 | 5/2015 | Hansen et al. | |

FOREIGN PATENT DOCUMENTS

| | | |
|---|---|---|
| CN | 1832480 A | 9/2006 |
| CN | 101388757 A | 3/2009 |
| CN | 101753286 A | 6/2010 |
| CN | 102882825 A | 1/2013 |
| GB | 2459807 A | 11/2009 |
| WO | 2013036642 A1 | 3/2013 |

OTHER PUBLICATIONS

Merlin, Simone et al., "Partial AID Field," IEEE 802.11-11/0039r0, Jan. 18, 2011, 8 pages.

IEEE, "Part 11: Wireless LAN Medium Access Control (MAC) and Physical Layer (PHY) Specifications, Amendment 4: Enhancements for Very High Throughput for Operation in Bands below 6 GHz," IEEE P802.11ac/D5.0, Draft Standard for Information Technology—Telecommunications and Information Exchange Between Systems—Local and Metropolitan Area Networks—Specific Requirements, IEEE P802.11ac/D5.0, Jan. 2013, 440 pages.

IEEE, "Part 11: Wireless LAN Medium Access Control (MAC) and Physical Layer (PHY) Specifications, Amendment 4: Enhancements for Very High Throughput for Operation in Bands below 6 GHz," IEEE Standard for Information Technology—Telecommunications and Information Exchange Between Systems Local and Metropolitan Area Networks—Specific Requirements, IEEE Std. 802.11ac, 2013, 425 pages.

\* cited by examiner

DATA TRANSMISSION METHOD AND APPARATUS

This application is a continuation of International Patent Application No. PCT/CN2013/078133, filed on Jun. 27, 2013, which is hereby incorporated by reference in its entirety.

TECHNICAL FIELD

The present invention relates to the communications field, and more specifically, to a data transmission method and apparatus.

BACKGROUND

As intelligent terminals are applied widely, requirements for data services grow exponentially. To meet people's requirements for Internet access anytime and anywhere, performance of a network system must be improved.

In some communications systems, a signal field at a physical layer of a data packet provides a partial association identifier field for carrying partial association identifier (partial AID) of a target receive end of the data packet, so that a receive end may determine the target receive end of the data packet by using the partial association identifier at the physical layer. Therefore, for example, if the receive end is not the target receive end of the data packet, the receive end does not need to continue to parse the data packet. Therefore, communication efficiency is improved, and device burden is reduced. However, due to a limit of a quantity of bits of the partial association identifier (or a quantity of available bits of the signal field), the partial association identifier can be used to distinguish only more than 500 receive ends, and cannot meet development requirements with fast increase of a user quantity. In addition, in some scenarios such as device to device (D2D) communication, a partial association ID field may be set to all zeros, and its function cannot be brought into play.

Furthermore, in a system that does not provide a partial association identifier field, for a received data packet, a receive end cannot identify a target receive end of the data packet at the physical layer, and can only perform Media Access Control (MAC) layer parsing on the data packet to acquire a MAC address carried in a MAC frame header, and identify the target receive end according to the MAC address. That is, after the receive end receives the data packet, even if the receive end is not the target receive end of the data packet, the receive end must also perform MAC layer parsing on the data packet, because the target receive end of the data packet can be identified only after MAC layer parsing is performed. Therefore, for a device that is not the target receive end of the data packet, device burden is increased, waste of hardware resources is caused, and user experience is affected.

SUMMARY

The present invention provides a data transmission method and apparatus, which can reduce burden of a receiving device, reduce waste of hardware resources, and improve user experience.

According to a first aspect, a data transmission method is provided, where the method includes determining, by a transmitting device, a long training sequence set, where the long training sequence set includes at least two long training sequences. The method also includes determining a mapping relationship between each long training sequence in the long training sequence set and first sub-identity information in identity information of each receiving device in a communications system, where one piece of identity information is used to uniquely indicate one receiving device in the communications system, and the first sub-identity information is a part or all of the identity information. When data needs to be transmitted to a target receiving device, the method also includes selecting a target long training sequence corresponding to the target receiving device from the long training sequence set according to first sub-identity information of the target receiving device and the mapping relationship. The method also includes performing encapsulation processing on the data according to the target long training sequence to generate a data packet, so as to carry, in a long training sequence field at a physical layer of the data packet, a long training sequence symbol used to indicate the target long training sequence; and sending the data packet to the target receiving device, so that the target receiving device processes the data packet according to the target long training sequence after acquiring the target long training sequence from the data packet.

With reference to the first aspect, in a first implementation manner of the first aspect, when the first sub-identity information is a part of the identity information, the performing encapsulation processing on the data to generate a data packet includes: performing encapsulation processing on the data to generate the data packet, where a second sub-identity information symbol is carried at the physical layer of the data packet, where the second sub-identity information symbol is used to indicate second sub-identity information of the target receiving device, and the second sub-identity information belongs to a part, except the first sub-identity information, in the identity information.

With reference to the first aspect and the foregoing implementation manner of the first aspect, in a second implementation manner of the first aspect, the second sub-identity information symbol is carried in a partial association identifier field at the physical layer of the data packet.

With reference to the first aspect and the foregoing implementation manners of the first aspect, in a third implementation manner of the first aspect, the long training sequence is a sequence with good correlation properties.

With reference to the first aspect and the foregoing implementation manners of the first aspect, in a fourth implementation manner of the first aspect, the sequence with good correlation properties is any one of the following sequences: a polyphase perfect sequence, a Gold sequence, a Gold-like sequence, and a pseudo-random sequence, for example, an m sequence.

With reference to the first aspect and the foregoing implementation manners of the first aspect, in a fifth implementation manner of the first aspect, the polyphase perfect sequence is any one of the following sequences: a Zadoff-Chu sequence, a Frank sequence, and a Combined Frank/Zadoff-Chu sequence.

With reference to the first aspect and the foregoing implementation manners of the first aspect, in a sixth implementation manner of the first aspect, a length of the long training sequence is determined according to a quantity of available subcarriers in the communications system.

With reference to the first aspect and the foregoing implementation manners of the first aspect, in a seventh implementation manner of the first aspect, the identity information is any one piece of the following information: a Media Access Control MAC address, an Internet Protocol IP address, a basic service set identifier BSSID, association identity information AID, a mobile phone number, an international mobile subscriber identity IMSI, and an international mobile equipment identity IMEI.

According to a second aspect, a data transmission method is provided, where the method includes determining, by a first receiving device in receiving devices, a long training sequence set, where the long training sequence set includes at least two long training sequences. The method also includes determining a mapping relationship between each long training sequence in the long training sequence set and first sub-identity information in identity information of each receiving device in a communications system, where one piece of identity information is used to uniquely indicate one receiving device in the communications system, and the first sub-identity information is a part or all of the identity information; when receiving a data packet transmitted by a transmitting device, acquiring a long training sequence symbol carried in a long training sequence field at a physical layer of the data packet, where the long training sequence symbol is used to indicate a target long training sequence, and the target long training sequence is determined by the transmitting device from the long training sequence set according to the mapping relationship. The method also includes processing the data packet according to the target long training sequence and the mapping relationship.

With reference to the second aspect, in a first implementation manner of the second aspect, the processing the data packet according to the target long training sequence and the mapping relationship includes: determining first sub-identity information of a target receiving device of the data packet according to the target long training sequence and the mapping relationship; and processing the data packet according to a relationship between first sub-identity information of the first receiving device and the first sub-identity information of the target receiving device.

With reference to the second aspect and the foregoing implementation manner of the second aspect, in a second implementation manner of the second aspect, the processing the data packet according to a relationship between first sub-identity information of the first receiving device and the first sub-identity information of the target receiving device includes discarding the data packet if the first sub-identity information of the first receiving device is different from the first sub-identity information of the target receiving device.

With reference to the second aspect and the foregoing implementation manners of the second aspect, in a third implementation manner of the second aspect, when the first sub-identity information is all of the identity information, the processing the data packet according to a relationship between first sub-identity information of the first receiving device and the first sub-identity information of the target receiving device includes: if the first sub-identity information of the first receiving device is the same as the first sub-identity information of the target receiving device, acquiring, from the data packet, data that needs to be transmitted by the transmitting device.

With reference to the second aspect and the foregoing implementation manners of the second aspect, in a fourth implementation manner of the second aspect, when the first sub-identity information is a part of the identity information, the processing the data packet according to a relationship between first sub-identity information of the first receiving device and the first sub-identity information of the target receiving device includes: if the first sub-identity information of the first receiving device is the same as the first sub-identity information of the target receiving device, acquiring a second sub-identity information symbol carried at the physical layer of the data packet, where the second sub-identity information symbol is used to indicate second sub-identity information of the target receiving device; and processing the data packet according to a relationship between the second sub-identity information of the target receiving device and second sub-identity information of the first receiving device, where the second sub-identity information belongs to a part, except the first sub-identity information, in the identity information.

With reference to the second aspect and the foregoing implementation manners of the second aspect, in a fifth implementation manner of the second aspect, the processing the data packet according to the target long training sequence and the mapping relationship includes: determining, according to first sub-identity information of the first receiving device and the mapping relationship, a first long training sequence corresponding to the first receiving device; and processing the data packet according to a relationship between the target long training sequence and the first long training sequence.

With reference to the second aspect and the foregoing implementation manners of the second aspect, in a sixth implementation manner of the second aspect, the processing the data packet according to a relationship between the target long training sequence and the first long training sequence includes: discarding the data packet if the target long training sequence is different from the first long training sequence.

With reference to the second aspect and the foregoing implementation manners of the second aspect, in a seventh implementation manner of the second aspect, when the first sub-identity information is all of the identity information, the processing the data packet according to a relationship between the target long training sequence and the first long training sequence includes: if the target long training sequence is the same as the first long training sequence, acquiring, from the data packet, data that needs to be transmitted by the transmitting device.

With reference to the second aspect and the foregoing implementation manners of the second aspect, in an eighth implementation manner of the second aspect, when the first sub-identity information is a part of the identity information, the processing the data packet according to a relationship between the target long training sequence and the first long training sequence includes: if the target long training sequence is the same as the first long training sequence, acquiring a second sub-identity information symbol carried at the physical layer of the data packet, where the second sub-identity information symbol is used to indicate second sub-identity information of the target receiving device; and processing the data packet according to a relationship between the second sub-identity information of the target receiving device and second sub-identity information of the first receiving device, where the second sub-identity information belongs to a part, except the first sub-identity information, in the identity information.

With reference to the second aspect and the foregoing implementation manners of the second aspect, in a ninth implementation manner of the second aspect, the processing the data packet according to a relationship between the second sub-identity information of the target receiving device and second sub-identity information of the first receiving device includes: discarding the data packet if the second sub-identity information of the target receiving device is different from the second sub-identity information of the first receiving device; or if the second sub-identity information of the target receiving device is the same as the second sub-identity information of the first receiving device, acquiring, from the data packet, data that needs to be transmitted by the transmitting device.

With reference to the second aspect and the foregoing implementation manners of the second aspect, in a tenth implementation manner of the second aspect, the second sub-identity information symbol is carried in a partial association identifier field at the physical layer of the data packet.

With reference to the second aspect and the foregoing implementation manners of the second aspect, in an eleventh implementation manner of the second aspect, the long training sequence is a sequence with good correlation properties.

With reference to the second aspect and the foregoing implementation manners of the second aspect, in a twelfth implementation manner of the second aspect, the sequence with good correlation properties is any one of the following sequences: a polyphase perfect sequence, a Gold sequence, a Gold-like sequence, and a pseudo-random sequence, for example, an m sequence.

With reference to the second aspect and the foregoing implementation manners of the second aspect, in a thirteenth implementation manner of the second aspect, the polyphase perfect sequence is any one of the following sequences: a Zadoff-Chu sequence, a Frank sequence, and a Combined Frank/Zadoff-Chu sequence.

With reference to the second aspect and the foregoing implementation manners of the second aspect, in a fourteenth implementation manner of the second aspect, a length of the long training sequence is determined according to a quantity of available subcarriers in the communications system.

With reference to the second aspect and the foregoing implementation manners of the second aspect, in a fifteenth implementation manner of the second aspect, the identity information is any one piece of the following information: a Media Access Control MAC address, an Internet Protocol IP address, a basic service set identifier BSSID, association identity information AID, a mobile phone number, an international mobile subscriber identity IMSI, and an international mobile equipment identity IMEI.

According to a third aspect, a data transmission apparatus is provided, where the apparatus includes: a determining unit, configured to determine a long training sequence set, where the long training sequence set includes at least two long training sequences, and determine a mapping relationship between each long training sequence in the long training sequence set and first sub-identity information in identity information of each receiving device in a communications system, where one piece of identity information is used to uniquely indicate one receiving device in the communications system, and the first sub-identity information is a part or all of the identity information; a selecting unit, configured to: when data needs to be transmitted to a target receiving device, select a target long training sequence corresponding to the target receiving device from the long training sequence set according to first sub-identity information of the target receiving device and the mapping relationship; a generating unit, configured to perform encapsulation processing on the data according to the target long training sequence to generate a data packet, so as to carry, in a long training sequence field at a physical layer of the data packet, a long training sequence symbol used to indicate the target long training sequence; and a sending unit, configured to send the data packet to the target receiving device, so that the target receiving device processes the data packet according to the target long training sequence after acquiring the target long training sequence from the data packet.

With reference to the third aspect, in a first implementation manner of the third aspect, when the first sub-identity information is a part of the identity information, the generating unit is specifically configured to perform encapsulation processing on the data to generate the data packet, where a second sub-identity information symbol is carried at the physical layer of the data packet, where the second sub-identity information symbol is used to indicate second sub-identity information of the target receiving device, and the second sub-identity information belongs to a part, except the first sub-identity information, in the identity information.

With reference to the third aspect and the foregoing implementation manner of the third aspect, in a second implementation manner of the third aspect, the second sub-identity information symbol is carried in a partial association identifier field at the physical layer of the data packet.

With reference to the third aspect and the foregoing implementation manners of the third aspect, in a third implementation manner of the third aspect, the long training sequence is a sequence with good correlation properties.

With reference to the third aspect and the foregoing implementation manners of the third aspect, in a fourth implementation manner of the third aspect, the sequence with good correlation properties is any one of the following sequences: a polyphase perfect sequence, a Gold sequence, a Gold-like sequence, and a pseudo-random sequence, for example, an m sequence.

With reference to the third aspect and the foregoing implementation manners of the third aspect, in a fifth implementation manner of the third aspect, the polyphase perfect sequence is any one of the following sequences: a Zadoff-Chu sequence, a Frank sequence, and a Combined Frank/Zadoff-Chu sequence.

With reference to the third aspect and the foregoing implementation manners of the third aspect, in a sixth implementation manner of the third aspect, a length of the long training sequence is determined according to a quantity of available subcarriers in the communications system.

With reference to the third aspect and the foregoing implementation manners of the third aspect, in a seventh implementation manner of the third aspect, the identity information is any one piece of the following information: a Media Access Control MAC address, an Internet Protocol IP address, a basic service set identifier BSSID, association identity information AID, a mobile phone number, an international mobile subscriber identity IMSI, and an international mobile equipment identity IMEI.

According to a fourth aspect, a data transmission apparatus is provided. The apparatus includes a determining unit, configured to determine a long training sequence set, where the long training sequence set includes at least two long training sequences, and determine a mapping relationship between each long training sequence in the long training sequence set and first sub-identity information in identity information of each receiving device in a communications system, where one piece of identity information is used to uniquely indicate one receiving device in the communications system, and the first sub-identity information is a part or all of the identity information. The apparatus also includes a receiving unit, configured to receive a data packet transmitted by a transmitting device; an acquiring unit, configured to acquire a long training sequence symbol carried in a long training sequence field at a physical layer of the data packet, where the long training sequence symbol is used to indicate a target long training sequence, and the target long training sequence is determined by the transmitting device from the long training sequence set according to the mapping relationship; and a processing unit, configured to process the data packet according to the target long training sequence and the mapping relationship.

With reference to the fourth aspect, in a first implementation manner of the fourth aspect, the processing unit is specifically configured to determine first sub-identity information of a target receiving device of the data packet according to the target long training sequence and the mapping relationship; and process the data packet according to a relationship between first sub-identity information of the first receiving device and the first sub-identity information of the target receiving device.

With reference to the fourth aspect and the foregoing implementation manner of the fourth aspect, in a second implementation manner of the fourth aspect, the processing unit is specifically configured to discard the data packet if the first sub-identity information of the first receiving device is different from the first sub-identity information of the target receiving device.

With reference to the fourth aspect and the foregoing implementation manners of the fourth aspect, in a third implementation manner of the fourth aspect, when the first sub-identity information is all of the identity information, the processing unit is specifically configured to: if the first sub-identity information of the first receiving device is the same as the first sub-identity information of the target receiving device, acquire, from the data packet, data that needs to be transmitted by the transmitting device.

With reference to the fourth aspect and the foregoing implementation manners of the fourth aspect, in a fourth implementation manner of the fourth aspect, when the first sub-identity information is a part of the identity information, the processing unit is specifically configured to: if the first sub-identity information of the first receiving device is the same as the first sub-identity information of the target receiving device, instruct the acquiring unit to acquire a second sub-identity information symbol carried at the physical layer of the data packet, where the second sub-identity information symbol is used to indicate second sub-identity information of the target receiving device; and process the data packet according to a relationship between the second sub-identity information of the target receiving device and second sub-identity information of the first receiving device, where the second sub-identity information belongs to a part, except the first sub-identity information, in the identity information.

With reference to the fourth aspect and the foregoing implementation manners of the fourth aspect, in a fifth implementation manner of the fourth aspect, the processing unit is specifically configured to determine, according to first sub-identity information of the first receiving device and the mapping relationship, a first long training sequence corresponding to the first receiving device; and process the data packet according to a relationship between the target long training sequence and the first long training sequence.

With reference to the fourth aspect and the foregoing implementation manners of the fourth aspect, in a sixth implementation manner of the fourth aspect, the processing unit is specifically configured to discard the data packet if the target long training sequence is different from the first long training sequence.

With reference to the fourth aspect and the foregoing implementation manners of the fourth aspect, in a seventh implementation manner of the fourth aspect, when the first sub-identity information is all of the identity information, the processing unit is specifically configured to: if the target long training sequence is the same as the first long training sequence, acquire, from the data packet, data that needs to be transmitted by the transmitting device.

With reference to the fourth aspect and the foregoing implementation manners of the fourth aspect, in an eighth implementation manner of the fourth aspect, when the first sub-identity information is a part of the identity information, the processing unit is specifically configured to: if the target long training sequence is the same as the first long training sequence, instruct the acquiring unit to acquire a second sub-identity information symbol carried at the physical layer of the data packet, where the second sub-identity information symbol is used to indicate second sub-identity information of the target receiving device; and process the data packet according to a relationship between the second sub-identity information of the target receiving device and second sub-identity information of the first receiving device, where the second sub-identity information belongs to a part, except the first sub-identity information, in the identity information.

With reference to the fourth aspect and the foregoing implementation manners of the fourth aspect, in a ninth implementation manner of the fourth aspect, the processing unit is specifically configured to discard the data packet if the second sub-identity information of the target receiving device is different from the second sub-identity information of the first receiving device; or if the second sub-identity information of the target receiving device is the same as the second sub-identity information of the first receiving device, acquire, from the data packet, data that needs to be transmitted by the transmitting device.

With reference to the fourth aspect and the foregoing implementation manners of the fourth aspect, in a tenth implementation manner of the fourth aspect, the second sub-identity information symbol is carried in a partial association identifier field at the physical layer of the data packet.

With reference to the fourth aspect and the foregoing implementation manners of the fourth aspect, in an eleventh implementation manner of the fourth aspect, the long training sequence is a sequence with good correlation properties.

With reference to the fourth aspect and the foregoing implementation manners of the fourth aspect, in a twelfth implementation manner of the fourth aspect, the sequence with good correlation properties is any one of the following sequences: a polyphase perfect sequence, a Gold sequence, a Gold-like sequence, and a pseudo-random sequence, for example, an m sequence.

With reference to the fourth aspect and the foregoing implementation manners of the fourth aspect, in a thirteenth implementation manner of the fourth aspect, the polyphase perfect sequence is any one of the following sequences: a Zadoff-Chu sequence, a Frank sequence, and a Combined Frank/Zadoff-Chu sequence.

With reference to the fourth aspect and the foregoing implementation manners of the fourth aspect, in a fourteenth implementation manner of the fourth aspect, a length of the long training sequence is determined according to a quantity of available subcarriers in the communications system.

With reference to the fourth aspect and the foregoing implementation manners of the fourth aspect, in a fifteenth implementation manner of the fourth aspect, the identity information is any one piece of the following information: a Media Access Control MAC address, an Internet Protocol IP address, a basic service set identifier BSSID, association identity information AID, a mobile phone number, an international mobile subscriber identity IMSI, and an international mobile equipment identity IMEI.

According to the data transmission method and apparatus in the present invention, a transmitting device determines a mapping relationship between each long training sequence in a long training sequence set and first sub-identity information of each receiving device, selects a target long training sequence according to first sub-identity information of a target receiving device and the mapping relationship, and adds the target long training sequence to a data packet, which can reduce burden of a receiving device, reduce waste of hardware resources, and improve

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions may be applied to a wireless local area network (WLAN), for example, wireless fidelity (Wi-Fi), or may be applied to various other communications systems in which a transmitting device sends information in a broadcast manner (over an air interface, or the like), that is, systems in which multiple devices can receive the information, for example, a Global System for Mobile Communications (GSM), a Code Division Multiple Access (CDMA) system, a Wideband Code Division Multiple Access (WCDMA) system, a General Packet Radio Service (GPRS) system, and a Long Term Evolution (LTE) system.

A receiving device and a transmitting device may be an access point (AP) or a user station (STA) in a WLAN, or may be a mobile terminal, mobile user equipment, or the like, which may communicate with one or more core networks through a radio access network (RAN). The receiving device and the transmitting device may be a mobile terminal, such as a mobile phone (or referred to as a "cellular" phone), or may be a computer with a mobile terminal, for example, a portable, pocket-sized, handheld, computer built-in, or vehicle-mounted mobile apparatus, which exchanges voice and/or data with a radio access network. The receiving device and the transmitting device may be a base transceiver station (BTS) in GSM or CDMA, or may be a NobeB in WCDMA, or may be an evolved NodeB (eNB or e-NodeB) in LTE, or may be a small-cell base station, which may be a micro base station, or may be a picocell (Pico) base station, or may be a home base station, also referred to as a femto base station. The present invention is not limited thereto.

Figure 1:
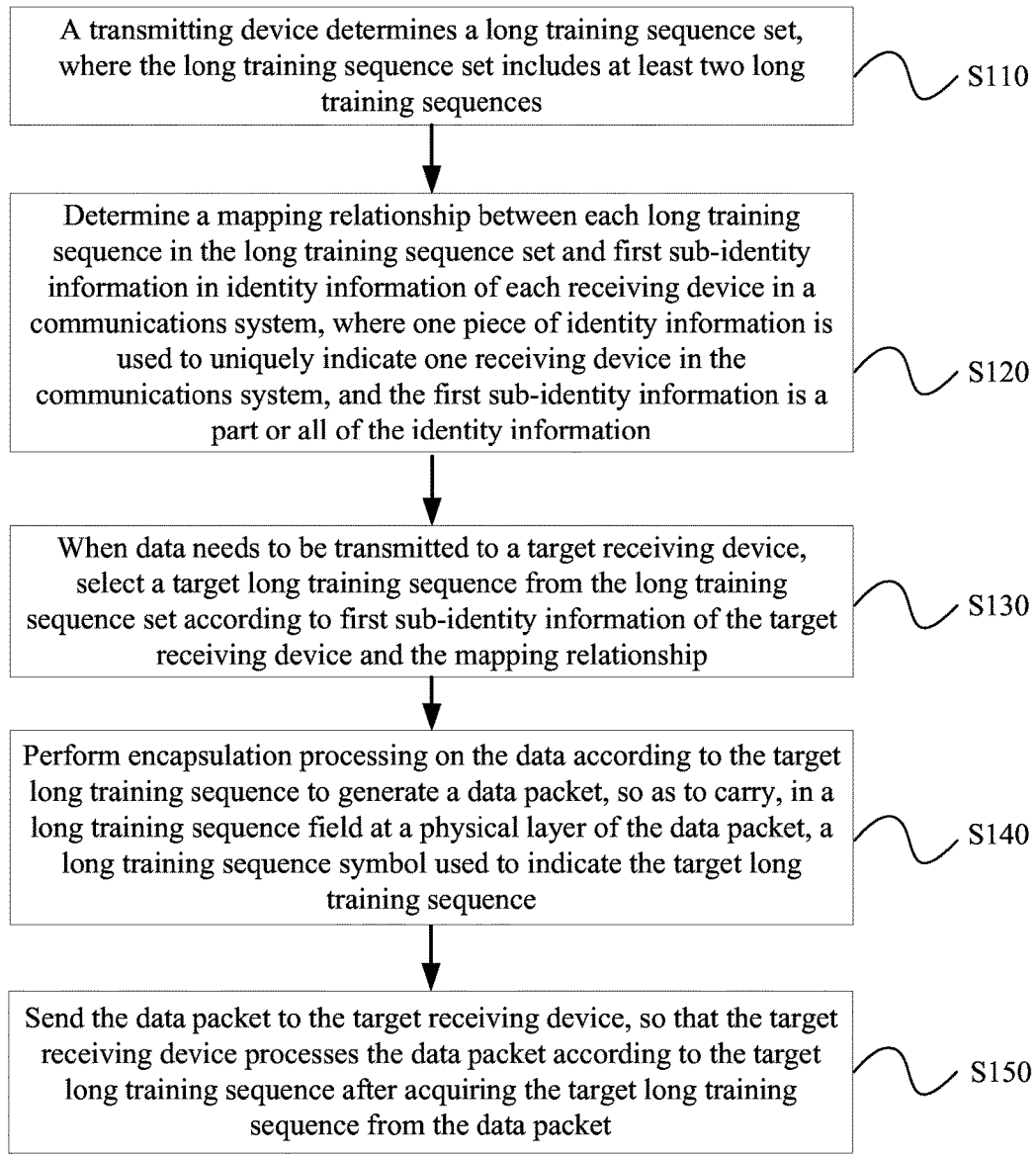
FIG. 1 is a schematic flowchart of a data transmission method according to an embodiment.

FIG. 1 shows a schematic flowchart of a data transmission method 100 described from a perspective of a transmitting device according to an embodiment. As shown in FIG. 1, the method 100 includes the following steps.

S110. A transmitting device determines a long training sequence set, where the long training sequence set includes at least two long training sequences.

S120. Determine a mapping relationship between each long training sequence in the long training sequence set and first sub-identity information in identity information of each receiving device in a communications system, where one piece of identity information is used to uniquely indicate one receiving device in the communications system, and the first sub-identity information is a part or all of the identity information.

S130. When data needs to be transmitted to a target receiving device, select a target long training sequence from the long training sequence set according to first sub-identity information of the target receiving device and the mapping relationship.

S140. Perform encapsulation processing on the data according to the target long training sequence to generate a data packet, so as to carry, in a long training sequence field at a physical layer of the data packet, a long training sequence symbol used to indicate the target long training sequence.

S150. Send the data packet to the target receiving device, so that the target receiving device processes the data packet according to the target long training sequence after acquiring the target long training sequence from the data packet.

In the prior art, a long training sequence (LTS, Long Training Sequence) is used for channel estimation, and in addition, in a same communications system, long training sequences used by various user equipments (including a receiving device and a transmitting device) are the same.

In contrast, in this embodiment, the communications system may use multiple (at least two) LTSs that are mutually different. In addition, for example, different LTSs may be allocated to different user equipment. When the transmitting device needs to transmit data to a target receiving device, the transmitting device may determine a target LTS corresponding to the target receiving device (in other words, allocated by the system to the target receiving device), and add the target LTS to a long training field (LTF, also referred to as a long training sequence field) at a physical layer of a data packet. Therefore, the receiving device may acquire the target LTS from the LTF of the data packet; and may perform receiving processing (for example, receiving or discarding) on the data packet according to a relationship between the LTS allocated by the system to the receiving device and the target LTS (for example, same or different), or may determine, according to the target LTS, a target receiving device corresponding to the target LTS (specifically, first sub-identity information of the target receiving device, where the parameter is described later in detail), and perform receiving processing (for example, receiving or discarding) on the data packet according to a relationship between first sub-identity information of the receiving device and the first sub-identity information of the target receiving device (for example, same or different). Therefore, the receiving device acquires, by parsing the LTF at the physical layer of the data packet, the target LTS carried in the LTF, and can confirm, by using the target LTS, whether the receiving device is the target receiving device of the data packet, which can reduce burden of the receiving device, reduce waste of hardware resources, and improve user experience.

Specifically, in S110, a device A (an example of the transmitting device, for example, may be an AP or a STA) in the communications system may predetermine a long training sequence set including multiple long training sequences (LTS).

In this embodiment, the long training sequence set may be generated by each device itself (including the receiving device and the transmitting device) in the system according to a preset rule, or may be generated, according to a preset rule, by an external device independent of the receiving device and the transmitting device and delivered to each device (including the receiving device and the transmitting device) in the system. For ease of understanding and description, the following uses the device A as an execution entity to describe a method and process for generating a long training sequence set.

Optionally, the long training sequence is a sequence with good correlation properties.

The sequence with good correlation properties is any one of the following sequences: a polyphase perfect sequence, a Gold sequence, and a pseudo-random sequence, for example, an m sequence.

In addition, the polyphase perfect sequence is any one of the following sequences: a Zadoff-Chu sequence, a Frank sequence, a Combined Frank/Zadoff-Chu sequence, and the like.

Specifically, currently, a great progress is made in the sequence design field, and people's research emphasis has shifted from a binary pseudo-random sequence to a sequence with good correlation properties such as a polyphase perfect sequence. Because the sequence with good correlation properties has good autocorrelation properties and cross-correlation properties, in this embodiment of the present invention, the sequence with good correlation properties may be used as the multiple LTSs. Therefore, the receiving device may use the good autocorrelation properties and cross-correlation properties of the LTS to accurately determine whether the LTS allocated by the system to the receiving device is consistent with the LTS carried in the data packet, and therefore, can determine whether the receiving device is the target receiving device of the data packet (this process is described later in detail). In addition, by using, for example, the polyphase perfect sequence, properties (for example, a generation formula) of the polyphase perfect sequence can be used to generate multiple LTSs quickly and conveniently and determine a mapping relationship between the multiple LTSs and receiving devices (specifically, first sub-identity information of each receiving device) (this process is described later in detail).

The sequences with good correlation properties may include: a polyphase perfect sequence, a Gold sequence, a Gold-like sequence, and a pseudo-random sequence with good correlation properties, for example, an m sequence.

Herein, properties, concepts, and the like of the polyphase perfect sequence, the Gold sequence, and the pseudo-random sequence may be similar to those in the prior art, and herein, to avoid repetition, description thereof is omitted. In addition, it should be noted that the foregoing listed sequences used as sequences with good correlation properties are only for exemplary description, and the present invention is not limited thereto. Other sequences with good correlation properties all fall within the protection scope of the present invention.

The polyphase perfect sequence may be: a Zadoff-Chu sequence, a Frank sequence, a Combined Frank/Zadoff-Chu sequence, or the like. Herein, properties, concepts, and the like of the Zadoff-Chu sequence, the Frank sequence, or the Combined Frank/Zadoff-Chu sequence may be similar to those in the prior art (for example, a sequence length of the Frank sequence can be only a square of a natural number), and herein, to avoid repetition, description thereof is omitted. In addition, it should be noted that the foregoing listed sequences used as polyphase perfect sequences are only for exemplary description, and the present invention is not limited thereto. Other sequences that can be used as polyphase perfect sequences, that is, sequences that have ideal autocorrelation properties and optimum cross-correlation properties, all fall within the protection scope of the present invention. For ease of understanding and description, the following uses an example in which the Zadoff-Chu sequence is used as a long training sequence to describe a process for generating a long training sequence set in this embodiment of the present invention.

In this embodiment of the present invention, a long training sequence set with multiple LTSs may be generated according to the properties of the polyphase perfect sequence (herein, specifically properties of the Zadoff-Chu sequence) by using a conventional Zadoff-Chu sequence generation formula.

For example, a length of the Zadoff-Chu sequence may be set according to a preset rule, and a basic long training sequence set C may be determined according to the determined sequence length and the formula 1 below:

$$C = \{\hat{a}^{(1)}, \ldots, \hat{a}^{(r)}, \ldots, \hat{a}^{(N-1)}\}, \qquad \text{Formula 1}$$

$$r = \{1, \ldots, N-1\},$$

$$\gcd(r, N) = 1$$

$$\hat{a}^{(r)} = (\hat{a}_0^{(r)}, \hat{a}_1^{(r)}, \ldots, \hat{a}_{N-1}^{(r)})$$

$$\hat{a}_n^{(r)} = \begin{cases} e^{\frac{i\pi}{N} r(n+1)n}, & N \text{ odd}, \\ e^{\frac{i\pi}{N} m^2}, & N \text{ even}, \end{cases}$$

$$0 \le n < N;$$

$$\gcd(r, N) = 1$$

N indicates a sequence length, and an r set is a set of natural numbers that are less than N and coprime with N. Because two adjacent natural numbers are coprime, the last element in the set is N−1. $\hat{a}^{(r)}$ indicates a basic long training sequence in the basic long training sequence set C, and $\hat{a}_n^{(r)}$ indicates the $n^{th}$ element in the basic long training sequence $\hat{a}^{(r)}$, where r is less than N, r and N are coprime, and i indicates an imaginary number unit (that is, $i^2=-1$). It should be noted that a quantity M of basic long training sequences in a Zadoff-Chu sequence set (in other words, a quantity of elements in the r set) is determined by the sequence length N, that is, M is "a quantity of natural numbers that are less than the sequence length and coprime with the sequence length"; therefore, when the Zadoff-Chu sequence is selected, on a premise of improving accuracy of channel estimation (the effect is described later in detail), a quantity of sequences included in the sequence set can be as large as possible if the sequence length is less than or equal to a maximum prime number of a quantity of subcarriers, and therefore a quantity of represented receiving devices can be increased.

Optionally, a length of the long training sequence is determined according to a quantity of available subcarriers in the communications system.

Specifically, in this embodiment, the long training sequence is used for channel estimation; therefore, for example, if the length of the long training sequence is equal to the quantity of available subcarriers in the communications system, elements in the long training sequence can be in one-to-one correspondence with the subcarriers, and therefore, accuracy of channel estimation is improved.

First, the device A may determine a system bandwidth. For example, the device A may acquire a bandwidth parameter (CH_BANDWIDTH) from a transceiver (TRX), determine the system bandwidth according to the bandwidth parameter, and further determine the quantity of available subcarriers in the system. For example, in a Wi-Fi system of the IEEE 802.11g standard, when a system bandwidth is 20 megahertz (MHz), the quantity of available subcarriers in the system is 53.

As described above, when the Zadoff-Chu sequence is selected, a quantity of sequences included in the sequence set can be as large as possible if the sequence length is less than or equal to a maximum prime number of a quantity of subcarriers, and therefore a quantity of represented receiving devices can be increased. The following uses an example in which the sequence length is set to 53 for description.

In a case in which the sequence length is set to 53 (that is, N=53), the following basic long training sequence set C may be generated according to the foregoing formula 1:

$C=\{\hat{a}^{(1)}, \ldots, \hat{a}^{(r)}, \ldots, \hat{a}^{(52)}\}$, $r=\{1, 2, \ldots, 52\}$, where a(1)={0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0} a(2)={0, 4, 12, 24, 40, 60, 84, 6, 38, 74, 8, 52, 100, 46, 102, 56, 14, 82, 48, 18, 98, 76, 58, 44, 34, 28, 26, 28, 34, 44, 58, 76, 98, 18, 48, 82, 14, 56, 102, 46, 100, 52, 8, 74, 38, 6, 84, 60, 40, 24, 12, 4, 0} a(3)={0, 6, 18, 36, 60, 90, 20, 62, 4, 58, 12, 78, 44, 16, 100, 84, 74, 70, 72, 80, 94, 8, 34, 66, 104, 42, 92, 42, 104, 66, 34, 8, 94, 80, 72, 70, 74, 84, 100, 16, 44, 78, 12, 58, 4, 62, 20, 90, 60, 36, 18, 6, 0} a(4)={0, 8, 24, 48, 80, 14, 62, 12, 76, 42, 16, 104, 94, 92, 98, 6, 28, 58, 96, 36, 90, 46, 10, 88, 68, 56, 52, 56, 68, 88, 10, 46, 90, 36, 96, 58, 28, 6, 98, 92, 94, 104, 16, 42, 76, 12, 62, 14, 80, 48, 24, 8, 0} a(5)={0, 10, 30, 60, 100, 44, 104, 68, 42, 26, 20, 24, 38, 62, 96, 34, 88, 46, 14, 98, 86, 84, 92, 4, 32, 70, 12, 70, 32, 4, 92, 84, 86, 98, 14, 46, 88, 34, 96, 62, 38, 24, 20, 26, 42, 68, 104, 44, 100, 60, 30, 10, 0} a(6)={0, 12, 36, 72, 14, 74, 40, 18, 8, 10, 24, 50, 88, 32, 94, 62, 42, 34, 38, 54, 82, 16, 68, 26, 102, 84, 78, 84, 102, 26, 68, 16, 82, 54, 38, 34, 42, 62, 94, 32, 88, 50, 24, 10, 8, 18, 40, 74, 14, 72, 36, 12, 0} a(7)={0, 14, 42, 84, 34, 104, 82, 74, 80, 100, 28, 76, 32, 2, 92, 90, 102, 22, 62, 10, 78, 54, 44, 48, 66, 98, 38, 98, 66, 48, 44, 54, 78, 10, 62, 22, 102, 90, 92, 2, 32, 76, 28, 100, 80, 74, 82, 104, 34, 84, 42, 14, 0} a(8)={0, 16, 48, 96, 54, 28, 18, 24, 46, 84, 32, 102, 82, 78, 90, 12, 56, 10, 86, 72, 74, 92, 20, 70, 30, 6, 104, 6, 30, 70, 20, 92, 74, 72, 86, 10, 56, 12, 90, 78, 82, 102, 32, 84, 46, 24, 18, 28, 54, 96, 48, 16, 0} a(9)={0, 18, 54, 2, 74, 58, 60, 80, 12, 68, 36, 22, 26, 48, 88, 40, 10, 104, 4, 28, 70, 24, 102, 92, 100, 20, 64, 20, 100, 92, 102, 24, 70, 28, 4, 104, 10, 40, 88, 48, 26, 22, 36, 68, 12, 80, 60, 58, 74, 2, 54, 18, 0} a(10)={0, 20, 60, 14, 94, 88, 102, 30, 84, 52, 40, 48, 76, 18, 86, 68, 70, 92, 28, 90, 66, 62, 78, 8, 64, 34, 24, 34, 64, 8, 78, 62, 66, 90, 28, 92, 70, 68, 86, 18, 76, 48, 40, 52, 84, 30, 102, 88, 94, 14, 60, 20, 0} a(11)={0, 22, 66, 26, 8, 12, 38, 86, 50, 36, 44, 74, 20, 94, 84, 96, 24, 80, 52, 46, 62, 100, 54, 30, 28, 48, 90, 48, 28, 30, 54, 100, 62, 46, 52, 80, 24, 96, 84, 94, 20, 74, 44, 36, 50, 86, 38, 12, 8, 26, 66, 22, 0} a(12)={0, 24, 72, 38, 28, 42, 80, 36, 16, 20, 48, 100, 70, 64, 82, 18, 84, 68, 76, 2, 58, 32, 30, 52, 98, 62, 50, 62, 98, 52, 30, 32, 58, 2, 76, 68, 84, 18, 82, 64, 70, 100, 48, 20, 16, 36, 80, 42, 28, 38, 72, 24, 0} a(13)={0, 26, 78, 50, 48, 72, 16, 92, 88, 4, 52, 20, 14, 34, 80, 46, 38, 56, 100, 64, 54, 70, 6, 74, 62, 76, 10, 76, 62, 74, 6, 70, 54, 64, 100, 56, 38, 46, 80, 34, 14, 20, 52, 4, 88, 92, 16, 72, 48, 50, 78, 26, 0} a(14)={0, 28, 84, 62, 68, 102, 58, 42, 54, 94, 56, 46, 64, 4, 78, 74, 98, 44, 18, 20, 50, 2, 88, 96, 26, 90, 76, 90, 26, 96, 88, 2, 50, 20, 18, 44, 98, 74, 78, 4, 64, 46, 56, 94, 54, 42, 58, 102, 68, 62, 84, 28, 0} a(15)={0, 30, 90, 74, 88, 26, 100, 98, 20, 78, 60, 72, 8, 80, 76, 102, 52, 32, 42, 82, 46, 40, 64, 12, 96, 104, 36, 104, 96, 12, 64, 40, 46, 82, 42, 32, 52, 102, 76, 80, 8, 72, 60, 78, 20, 98, 100, 26, 88, 74, 90, 30, 0} a(16)={0, 32, 96, 86, 2, 56, 36, 48, 92, 62, 64, 98, 58, 50, 74, 24, 6, 20, 66, 38, 42, 78, 40, 34, 60, 12, 102, 12, 60, 34, 40, 78, 42, 38, 66, 20, 6, 24, 74, 50, 58, 98, 64, 62, 92, 48, 36, 56, 2, 86, 96, 32, 0} a(17)={0, 34, 102, 98, 22, 86, 78, 104, 58, 46, 68, 18, 2, 20, 72, 52, 66, 8, 90, 100, 38, 10, 16, 56, 24, 26, 62, 26, 24, 56, 16, 10, 38, 100, 90, 8, 66, 52, 72, 20, 2, 18, 68, 46, 58, 104, 78, 86, 22, 98, 102, 34, 0} a(18)={0, 36, 2, 4, 42, 10, 14, 54, 24, 30, 72, 44, 52, 96, 70, 80, 20, 102, 8, 56, 34, 48, 98, 78, 94, 40, 22, 40, 94, 78, 98, 48, 34, 56, 8, 102, 20, 80, 70, 96, 52, 44, 72, 30, 24, 54, 14, 10, 42, 4, 2, 36, 0} a(19)={0, 38, 8, 16, 62, 40, 56, 4, 96, 14, 76, 70, 102, 66, 68, 2, 80, 90, 32, 12, 30, 86, 74, 100, 58, 54, 88, 54, 58, 100, 74, 86, 30, 12, 32, 90, 80, 2, 68, 66, 102, 70, 76, 14, 96, 4, 56, 40, 62, 16, 8, 38, 0} a(20)={0, 40, 14, 28, 82, 70, 98, 60, 62, 104, 80, 96, 46, 36, 66, 30, 34, 78, 56, 74, 26, 18, 50, 16, 22, 68, 48, 68, 22, 16, 50, 18, 26, 74, 56, 78, 34, 30, 66, 36, 46, 96, 80, 104, 62, 60, 98, 70, 82, 28, 14, 40, 0} a(21)={0, 42, 20, 40, 102, 100, 34, 10, 28, 88, 84, 16, 96, 6, 64, 58, 94, 66, 80, 30, 22, 56, 26, 38, 92, 82, 8, 82, 92, 38, 26, 56, 22, 30, 80, 66, 94, 58, 64, 6, 96, 16, 84, 88, 28, 10, 34, 100, 102, 40, 20, 42, 0} a(22)={0, 44, 26, 52, 16, 24, 76, 66, 100, 72, 88, 42, 40, 82, 62, 86, 48, 54, 104, 92, 18, 94, 2, 60, 56, 96, 74, 96, 56, 60, 2, 94, 18, 92, 104, 54, 48, 86, 62, 82, 40, 42, 88, 72, 100, 66, 76, 24, 16, 52, 26, 44, 0} a(23)={0, 46, 32, 64, 36, 54, 12, 16, 66, 56, 92, 68, 90, 52, 60, 8, 2, 42, 22, 48, 14, 26, 84, 82, 20, 4, 34, 4, 20, 82, 84, 26, 14, 48, 22, 42, 2, 8, 60, 52, 90, 68, 92, 56, 66, 16, 12, 54, 36, 64, 32, 46, 0} a(24)={0, 48, 38, 76, 56, 84, 54, 72, 32, 40, 96, 94, 34, 22, 58, 36, 62, 30, 46, 4, 10, 64, 60, 104, 90, 18, 100, 18, 90, 104, 60, 64, 10, 4, 46, 30, 62, 36, 58, 22, 34, 94, 96, 40, 32, 72, 54, 84, 56, 76, 38, 48, 0} a(25)={0, 50, 44, 88, 76, 8, 96, 22, 104, 24, 100, 14, 84, 98, 56, 64, 16, 18, 70, 66, 6, 102, 36, 20, 54, 32, 60, 32, 54, 20, 36, 102, 6, 66, 70, 18, 16, 64, 56, 98, 84, 14, 100, 24, 104, 22, 96, 8, 76, 88, 44, 50, 0} a(26)={0, 52, 50, 100, 96, 38, 32, 78, 70, 8, 104, 40, 28, 68, 54, 92, 76, 6, 94, 22, 2, 34, 12, 42, 18, 46, 20, 46, 18, 42, 12, 34, 2, 22, 94, 6, 76, 92, 54, 68, 28, 40, 104, 8, 70, 78, 32, 38, 96, 100, 50, 52, 0} a(27)={0, 54, 56, 6, 10, 68, 74, 28, 36, 98, 2, 66, 78, 38, 52, 14, 30, 100, 12, 84, 104, 72, 94, 64, 88, 60, 86, 60, 88, 64, 94, 72, 104, 84, 12, 100, 30, 14, 52, 38, 78, 66, 2, 98, 36, 28, 74, 68, 10, 6, 56, 54, 0} a(28)={0, 56, 62, 18, 30, 98, 10, 84, 2, 82, 6, 92, 22, 8, 50, 42, 90, 88, 36, 40, 100, 4, 70, 86, 52, 74, 46, 74, 52, 86, 70, 4, 100, 40, 36, 88, 90, 42, 50, 8, 22, 92, 6, 82, 2, 84, 10, 98, 30, 18, 62, 56, 0} a(29)={0, 58, 68, 30, 50, 22, 52, 34, 74, 66, 10, 12, 72, 84, 48, 70, 44, 76, 60, 102, 96, 42, 46, 2, 16, 88, 6, 88, 16, 2, 46, 42, 96, 102, 60, 76, 44, 70, 48, 84, 72, 12, 10, 66, 74, 34, 52, 22, 50, 30, 68, 58, 0} a(30)={0, 60, 74, 42, 70, 52, 94, 90, 40, 50, 14, 38, 16, 54, 46, 98, 104, 64, 84, 58, 92, 80, 22, 24, 86, 102, 72, 102, 86, 24, 22, 80, 92, 58, 84, 64, 104, 98, 46, 54, 16, 38, 14, 50, 40, 90, 94, 52, 70, 42, 74, 60, 0} a(31)={0, 62, 80, 54, 90, 82, 30, 40, 6, 34, 18, 64, 66, 24, 44, 20, 58, 52, 2, 14, 88, 12, 104, 46, 50, 10, 32, 10, 50, 46, 104, 12, 88, 14, 2, 52, 58, 20, 44, 24, 66, 64, 18, 34, 6, 40, 30, 82, 90, 54, 80, 62, 0} a(32)={0, 64, 86, 66, 4, 6, 72, 96, 78, 18, 22, 90, 10, 100, 42, 48, 12, 40, 26, 76, 84, 50, 80, 68, 14, 24, 98, 24, 14, 68, 80, 50, 84, 76, 26, 40, 12, 48, 42, 100, 10, 90, 22, 18, 78, 96, 72, 6, 4, 66, 86, 64, 0} a(33)={0, 66, 92, 78, 24, 36, 8, 46, 44, 2, 26, 10, 60, 70, 40, 76, 72, 28, 50, 32, 80, 88, 56, 90, 84, 38, 58, 38, 84, 90, 56, 88, 80, 32, 50, 28, 72, 76, 40, 70, 60, 10, 26, 2, 44, 46, 8, 36, 24, 78, 92, 66, 0} a(34)={0, 68, 98, 90, 44, 66, 50, 102, 10, 92, 30, 36, 4, 40, 38, 104, 26, 16, 74, 94, 76, 20, 32, 6, 48, 52, 18, 52, 48, 6, 32, 20, 76, 94, 74, 16, 26, 104, 38, 40, 4, 36, 30, 92, 10, 102, 50, 66, 44, 90, 98, 68, 0} a(35)={0, 70, 104, 102, 64, 96, 92, 52, 82, 76, 34, 62, 54, 10, 36, 26, 86, 4, 98, 50, 72, 58, 8, 28, 12, 66, 84, 66, 12, 28, 8, 58, 72, 50, 98, 4, 86, 26, 36, 10, 54, 62, 34, 76, 82, 52, 92, 96, 64, 102, 104, 70, 0} a(36)={0, 72, 4, 8, 84, 20, 28, 2, 48, 60, 38, 88, 104, 86, 34, 54, 40, 98, 16, 6, 68, 96, 90, 50, 82, 80, 44, 80, 82, 50, 90, 96, 68, 6, 16, 98, 40, 54, 34, 86, 104, 88, 38, 60, 48, 2, 28, 20, 84, 8, 4, 72, 0} a(37)={0, 74, 10, 20, 104, 50, 70, 58, 14, 44, 42, 8, 48, 56, 32, 82, 100, 86, 40, 68, 64, 28, 66, 72, 46, 94, 4, 94, 46, 72, 66, 28, 64, 68, 40, 86, 100, 82, 32, 56, 48, 8, 42, 44, 14, 58, 70, 50, 104, 20, 10, 74, 0} a(38)={0, 76, 16, 32, 18, 80, 6, 8, 86, 28, 46, 34, 98, 26, 30, 4, 54, 74, 64, 24, 60, 66, 42, 94, 10, 2, 70, 2, 10, 94, 42, 66, 60, 24, 64, 74, 54, 4, 30, 26, 98, 34, 46, 28, 86, 8, 6, 80, 18, 32, 16, 76, 0} a(39)={0, 78, 22, 44, 38, 4, 48, 64, 52, 12, 50, 60, 42, 102, 28, 32, 8, 62, 88, 86, 56, 104, 18, 10, 80, 16, 30, 16, 80, 10, 18, 104, 56, 86, 88, 62, 8, 32, 28, 102, 42, 60, 50, 12, 52, 64, 48, 4, 38, 44, 22, 78, 0} a(40)={0, 80, 28, 56, 58, 34, 90, 14, 18, 102, 54, 86, 92, 72, 26, 60, 68, 50, 6, 42, 52, 36, 100, 32, 44, 30, 96, 30, 44, 32, 100, 36, 52, 42, 6, 50, 68, 60, 26, 72, 92, 86, 54, 102, 18, 14, 90, 34, 58, 56, 28, 80, 0} a(41)={0, 82, 34, 68, 78, 64, 26, 70, 90, 86, 58, 6, 36, 42, 24, 88, 22, 38, 30, 104, 48, 74, 76, 54, 8, 44, 56, 44, 8, 54, 76, 74, 48, 104, 30, 38, 22, 88, 24, 42, 36, 6, 58, 86, 90, 70, 26, 64, 78, 68, 34, 82, 0} a(42)={0, 84, 40, 80, 98, 94, 68, 20, 56, 70, 62, 32, 86, 12, 22, 10, 82, 26, 54, 60, 44, 6, 52, 76, 78, 58, 16, 58, 78, 76, 52, 6, 44, 60, 54, 26, 82, 10, 22, 12, 86, 32, 62, 70, 56, 20, 68, 94, 98, 80, 40, 84, 0} a(43)={0, 86, 46, 92, 12, 18, 4, 76, 22, 54, 66, 58, 30, 88, 20, 38, 36, 14, 78, 16, 40, 44, 28, 98, 42, 72, 82, 72, 42, 98, 28, 44, 40, 16, 78, 14, 36, 38, 20, 88, 30, 58, 66, 54, 22, 76, 4, 18, 12, 92, 46, 86, 0} a(44)={0, 88, 52, 104, 32, 48, 46, 26, 94, 38, 70, 84, 80, 58, 18, 66, 96, 2, 102, 78, 36, 82, 4, 14, 6, 86, 42, 86, 6, 14, 4, 82, 36, 78, 102, 2, 96, 66, 18, 58, 80, 84, 70, 38, 94, 26, 46, 48, 32, 104, 52, 88, 0} a(45)={0, 90, 58, 10, 52, 78, 88, 82, 60, 22, 74, 4, 24, 28, 16, 94, 50, 96, 20, 34, 32, 14, 86, 36, 76, 100, 2, 100, 76, 36, 86, 14, 32, 34, 20, 96, 50, 94, 16, 28, 24, 4, 74, 22, 60, 82, 88, 78, 52, 10, 58, 90, 0} a(46)={0, 92, 64, 22, 72, 2, 24, 32, 26, 6, 78, 30, 74, 104, 14, 16, 4, 84, 44, 96, 28, 52, 62, 58, 40, 8, 68, 8, 40, 58, 62, 52, 28, 96, 44, 84, 4, 16, 14, 104, 74, 30, 78, 6, 26, 32, 24, 2, 72, 22, 64, 92, 0} a(47)={0, 94, 70, 34, 92, 32, 66, 88, 98, 96, 82, 56, 18, 74, 12, 44, 64, 72, 68, 52, 24, 90, 38, 80, 4, 22, 28, 22, 4, 80, 38, 90, 24, 52, 68, 72, 64, 44, 12, 74, 18, 56, 82, 96, 98, 88, 66, 32, 92, 34, 70, 94, 0} a(48)={0, 96, 76, 46, 6, 62, 2, 38, 64, 80, 86, 82, 68, 44, 10, 72, 18, 60, 92, 8, 20, 22, 14, 102, 74, 36, 94, 36, 74, 102, 14, 22, 20, 8, 92, 60, 18, 72, 10, 44, 68, 82, 86, 80, 64, 38, 2, 62, 6, 46, 76, 96, 0} a(49)={0, 98, 82, 58, 26, 92, 44, 94, 30, 64, 90, 2, 12, 14, 8, 100, 78, 48, 10, 70, 16, 60, 96, 18, 38, 50, 54, 50, 38, 18, 96, 60, 16, 70, 10, 48, 78, 100, 8, 14, 12, 2, 90, 64, 30, 94, 44, 92, 26, 58, 82, 98, 0} a(50)={0, 100, 88, 70, 46, 16, 86, 44, 102, 48, 94, 28, 62, 90, 6, 22, 32, 36, 34, 26, 12, 98, 72, 40, 2, 64, 14, 64, 2, 40, 72, 98, 12, 26, 34, 36, 32, 22, 6, 90, 62, 28, 94, 48, 102, 44, 86, 16, 46, 70, 88, 100, 0} a(51)={0, 102, 94, 82, 66, 46, 22, 100, 68, 32, 98, 54, 6, 60, 4, 50, 92, 24, 58, 88, 8, 30, 48, 62, 72, 78, 80, 78, 72, 62, 48, 30, 8, 88, 58, 24, 92, 50, 4, 60, 6, 54, 98, 32, 68, 100, 22, 46, 66, 82, 94, 102, 0} a(52)={0, 104, 100, 94, 86, 76, 64, 50, 34, 16, 102, 80, 56, 30, 2, 78, 46, 12, 82, 44, 4, 68, 24, 84, 36, 92, 40, 92, 36, 84, 24, 68, 4, 44, 82, 12, 46, 78, 2, 30, 56, 80, 102, 16, 34, 50, 64, 76, 86, 94, 100, 104, 0}

Herein, it should be noted that a number in the foregoing sequence sets is equal to a number obtained after a modulo-2N operation is performed on rn(n+1) in the generation formula 1, and represents a complex number point on a unit circle. For example, 104 in a(52), which is the second element in a(52) and is corresponding to n=1 (the first element is corresponding to n=0), represents a complex number $$e^{\frac{i2\pi}{2*53}*52*1*(1+1)} = e^{\frac{i2\pi}{2*53}*104}.$$

In this embodiment, each numeric value in the set may also be represented in a complete complex number expression manner according to an actual requirement, which is not particularly limited in the present invention.

Afterward, a cyclic shift may be performed on the sequences in the basic sequence set to generate a complete long training sequence set C'. For example, as described above, if the sequence length is 53, a cyclic shift of 1 to 52 positions may be performed on a(1) to generate sequences a(1, 0), . . . , a(1, t), . . . , a(1, 52), where t indicates a quantity of positions of the cyclic shift.

That is, C'={$\hat{a}^{(1,0)}$, . . . $\hat{a}^{(1,52)}$, . . . , $\hat{a}^{(r,0)}$ . . . $\hat{a}^{(r,52)}$, . . . , $\hat{a}^{(52,0)}$, . . . , $\hat{a}^{(52,52)}$}, r={1,2, . . . , 52}, where a(1, 0)={0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0} a(1, 1)={2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0} a(1, 2)={6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2} a(1, 3)={12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6} a(1, 4)={20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12} a(1, 5)={30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20} a(1, 6)={42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30} a(1, 7)={56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42} a(1, 8)={72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56} a(1, 9)={90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72} a(1, 10)={4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90} a(1, 11)={26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4} a(1, 12)={50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26} a(1, 13)={76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50} a(1, 14)={104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76} a(1, 15)={28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104} a(1, 16)={60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28} a(1, 17)={94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60} a(1, 18)={24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94} a(1, 19)={62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24} a(1, 20)={102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62} a(1, 21)={38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102} a(1, 22)={82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38} a(1, 23)={22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82} a(1, 24)={70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22} a(1, 25)={14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70} a(1, 26)={66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14} a(1, 27)={14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66} a(1, 28)={70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14} a(1, 29)={22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70} a(1, 30)={82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22} a(1, 31)={38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82} a(1, 32)={102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38} a(1, 33)={62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102} a(1, 34)={24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62} a(1, 35)={94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24} a(1, 36)={60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94} a(1, 37)={28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60} a(1, 38)={104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28} a(1, 39)={76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104} a(1, 40)={50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76} a(1, 41)={26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50} a(1, 42)={4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26} a(1, 43)={90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4} a(1, 44)={72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90} a(1, 45)={56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72} a(1, 46)={42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56} a(1, 47)={30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42} a(1, 48)={20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30} a(1, 49)={12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20} a(1, 50)={6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12} a(1, 51)={2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6} a(1, 52)={0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2}

The same method may be used to perform a cyclic shift on a(2) to a(52), and herein, to avoid repetition, description thereof is omitted.

As described above, the long training sequence set C' in this embodiment is generated. That is, according to the method for generating a long training sequence in this embodiment, for example, in a case in which the quantity of available subcarriers in the system is 53, if a Zadoff-Chu sequence with a length of 53 is selected, 52×53=2756 long training sequences may be generated. Therefore, 2756 devices can be distinguished by using the long training sequences generated according to this embodiment of the present invention, and this quantity is far greater than a quantity of devices that can be distinguished by using partial association identifier, which may meet a development requirement as a quantity of users increases quickly.

It should be understood that the foregoing listed method for determining each parameter in the method for generating a long training sequence is only for exemplary description. A person skilled in the art may randomly modify or select a used parameter according to the communications system to which this embodiment of the present invention is applicable, for example, may randomly set the length of the long training sequence. For another example, after the foregoing basic long training sequence set C is obtained, no cyclic shift is performed, but instead, the basic long training sequence set C may be directly used as a long training sequence set C', or cyclic shifts may be performed in a length range of the long training sequence for any times (in other words, any quantity of positions), which is not particularly limited in the present invention. In addition, in this embodiment of the present invention, for example, a pseudo-random sequence may also be used as a basic sequence for generating multiple LTSs used by the communications system, to generate the multiple different LTSs.

In addition, in this embodiment, the device A may further number each long training sequence in the long training sequence set C' determined in the foregoing step S110, for example, may set numbers of basic long training sequences to i=1, . . . , 52. Therefore, a shift of each long training sequence relative to the basic long training sequence is j=0, 1, . . . , 52. Therefore, the number of each long training sequence in the long training sequence set C' may be set to LTS ID=(i−1)×53+j.

In the basic long training sequence set C, numbers of sequences are set to i=1, . . . , 52.

In the long training sequence set C', a shift of each long training sequence relative to the basic long training sequence is j=0, 1, . . . , 52. Therefore, numbers of sequences may be set to LTS ID=(i−1)×53+j.

It should be understood that the foregoing listed numbering method is only for exemplary description, and the present invention is not limited thereto. Other numbering methods that can be used to uniquely distinguish a long training sequence from the long training sequence set C' all fall within the protection scope of the present invention.

In S120, the device A may determine a mapping relationship between the foregoing acquired long training sequence set C' and each terminal device in the system.

In this embodiment, the foregoing mapping relationship may be generated by each device itself (including the receiving device and the transmitting device) in the system according to a preset rule, or may be generated, according to a preset rule, by an external device independent of the receiving device and the transmitting device and delivered to each device (including the receiving device and the transmitting device) in the system. For ease of understanding and description, the following uses the device A as an execution entity to describe a method and process for determining a mapping relationship between the long training sequence set C' and each terminal device (specifically, a part or all of identity information of the terminal device, which is described later in detail) in the system.

First, the device A may select identity information of a device, where the identity information of the device is used to generate the foregoing mapping relationship.

Optionally, the identity information is any one piece of the following information: a Media Access Control MAC address, an Internet Protocol IP address, a basic service set identifier BSSID, association identity information AID, a mobile phone number, an international mobile subscriber identity IMSI, and an international mobile equipment identity IMEI.

Specifically, in this embodiment, the identity information of the device refers to information that can uniquely identify the device in a communications system in this embodiment. It should be noted that in this embodiment, the identity information may be information carried by the device at delivery, or may be allocated by the system to the device, which is not particularly limited in the present invention.

In this embodiment, the identity information may include information such as a Media Access Control (MAC) address, an Internet Protocol (IP) address, a basic service set identifier (BSSID), association identity information (AID), a mobile phone number, an international mobile subscriber identity (IMSI), and an international mobile equipment identity (IMEI). It should be understood that a subscriber identity in this embodiment is not limited to the foregoing information. Other information elements that can uniquely indicate the subscriber identity all fall within the scope of this embodiment.

For example, the device A may acquire a quantity of terminal devices accessing the system and identity information (for example, BSSIDs or AIDs) of the terminal devices, and therefore, may generate a mapping relationship between the identity information of the terminal devices and long training sequences according to the quantity of terminal devices and the quantity of generated long training sequences.

For example, if the quantity of generated long training sequences is greater than the quantity of terminal devices accessing the system, long training sequences of a quantity same as the quantity of terminal devices may be selected, and the long training sequences are in one-to-one correspondence with identity information of the terminal devices.

If the quantity of generated long training sequences is equal to the quantity of terminal devices accessing the system, the long training sequences may be in one-to-one correspondence with identity information of the terminal devices.

If the quantity of generated long training sequences is less than the quantity of terminal devices accessing the system, a part or all of the long training sequences may correspond to a part of identity information of the terminal devices (an example of first sub-identity information). In addition, a part or all of a remaining part of the identity information (an example of second sub-identity information) is carried in another field at the physical layer, which is described later in detail.

In the foregoing process, each device in the system needs to communicate with a management device or the like in the system in real time or periodically, to determine identity information of the terminal devices accessing the system and adjust the foregoing mapping relationship, which increases device burden and occupies communication resources.

Therefore, in this embodiment, identity information that can uniquely identify terminal devices in the communications system may be selected and used. Therefore, all terminal devices that can be identified by the identity information may be considered as devices accessing and using the communications system in this embodiment.

For ease of understanding, the following uses a MAC address as identity information for description.

Figure 2:
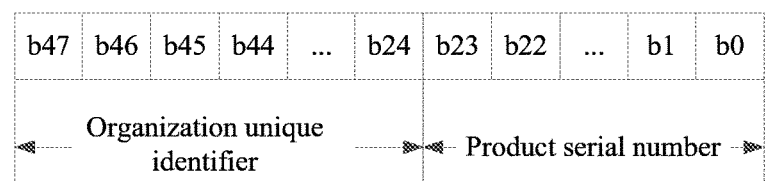
FIG. 2 is a structural diagram of a MAC address.

First, a structure of the MAC address is described. FIG. 2 shows the structure of the MAC address. As shown in FIG. 2, the MAC address includes 48 bits, where an organization unique identifier (OUI) occupies bits b24 to b47 of the MAC address, is allocated by the Institute of Electrical and Electronics Engineers (IEEE, Institute of Electrical and Electronics Engineers), and may be understood as an identifier of a device manufacturer. A product serial number (PSN) occupies bits b0 to b23 of the MAC address, and is allocated by a device manufacturer.

Because the MAC address includes 48 bits, theoretically, the MAC address can identify $2^{48}$ devices. This quantity is far greater than the quantity of generated long training sequences. Therefore, in this embodiment, some bits (first sub-identity information) may be selected from the MAC address, and a mapping relationship between the first sub-identity information and each long training sequence may be set. That is, in this embodiment, one long training sequence may be mapped to multiple devices that have same first sub-identity information, and some or all remaining bits (an example of second sub-identity information) are carried in another field at a physical layer (this process is described later in detail).

In this embodiment, the device A may determine the first sub-identity information from the identity information according to the quantity of long training sequences generated in S110. As described above, in a case in which 52×53=2756 long training sequences are generated, the first sub-identity information may be determined in the following manners.

For example, 11 bits (for example, bits b0 to b10 in the MAC address, that is, first 11 bits in the PSN, which can identify $2^{11}$=2048 devices) may be selected from the MAC address, and used as the first sub-identity information.

For another example, 22 bits, for example, bits b0 to b21, may be selected from the MAC address, 11 bits are generated according to a preset operation rule, for example, the formula 2 below, and the 11 bits are used as the first sub-identity information (can identify $2^{11}=2048$ devices).

$$c(i)=b(2i)\oplus b(2i+1), i=0,1,\ldots,10 \quad \text{Formula 2}$$

Alternatively, 24 bits, for example, bits b0 to b23, may be selected from the MAC address, 11 bits are generated according to a preset operation rule, for example, the formula 3 below, and the 11 bits are used as the first sub-identity information (can identify $2^{11}=2048$ devices).

$$c(i)=b(2i)\oplus b(2i+1), i=0,1,\ldots,8$$

$$c(9)=b(18)\oplus b(19)\oplus b(20)$$

$$c(10)=b(21)\oplus b(22)\oplus b(23) \quad \text{Formula 3}$$

In the formula 2 and the formula 3, "⊕" indicates exclusive OR processing.

Therefore, a mapping relationship between each long training sequence and each piece of first sub-identity information may be determined according to the preset rule. By using the preset rule, for example, the 11-bit binary first sub-identity information may be converted into a decimal number, and the number of converted first sub-identity information corresponds to a long training sequence having a same ID number as the foregoing determined long training sequence.

For another example, more than 11 bits (for example, bits b0 to b23 in the MAC address, that is, all of the PSN, which can identify $2^{24}$ devices) may be selected from the MAC address, and used as the first sub-identity information. In this case, the quantity of long training sequences is less than the quantity of devices that the first sub-identity information can identify. Therefore, the 24-bit binary first sub-identity information may be converted into a decimal number, and modulo operation processing is performed on a preset number (for example, the quantity of long training sequences) by using the number obtained after converting the first sub-identity information, and multiple pieces of first sub-identity information with a same modulus value correspond to one long training sequence.

It should be noted that the foregoing determined mapping relationship between each piece of first sub-identity information and each long training sequence may be recorded in an entry to form a list of mapping relationships, or may be expressed as a function relationship expression, which is not particularly limited in the present invention.

It should be understood that the foregoing listed method for selecting first sub-identity information is only for exemplary description, which is not particularly limited in the present invention. For example, the first sub-identity information may be determined from an OUI of a MAC address, or some consecutive or inconsecutive bytes may be selected from an IP address, a BSSID, an AID, a mobile phone number, an IMSI, or an IMEI, and used as the first sub-identity information. In addition, the foregoing listed method for determining a mapping relationship between each piece of first sub-identity information and each long training sequence is only for exemplary description, which is not particularly limited in the present invention. It should be noted that the methods for determining the foregoing first sub-identity information and the foregoing mapping relationship by all devices in the system need to be consistent, so as to ensure that a long training sequence (or the first sub-identity information) determined by a transmitting device and corresponding to a target receiving device is consistent with a long training sequence (or the first sub-identity information) determined by the target receiving device and corresponding to the target receiving device.

In this embodiment, the target receiving device may be one device (that is, case A) in the system, or may be all devices (that is, case B) in the system. The following first describes the case in which the target receiving device is one device.

Case A

Optionally, in this embodiment, when the target receiving device is one receiving device in the communications system, the selecting a target long training sequence from the long training sequence set according to first sub-identity information of the target receiving device and the mapping relationship includes selecting, from the long training sequence set according to the first sub-identity information of the target receiving device and the mapping relationship, a second long training sequence corresponding to only the first sub-identity information of the target receiving device as the target long training sequence.

Specifically, in S130, when the device A needs to transmit data to a device B (an example of the target receiving device), the device A may determine first sub-identity information of the device B, for example, in a case in which a MAC address is used as identity information, may determine the first sub-identity information from a destination MAC address according to a preset rule (consistent with the rule used to determine the first sub-identity information in S120), and determine, according to the mapping relationship determined in S120 and the first sub-identity information of the device B, (by searching a table or performing substitution in a function relationship expression), a long training sequence (hereinafter recorded as a long training sequence B) corresponding to the device B.

In S140, the device A may perform encapsulation processing on the data to be sent, to generate a data packet. In this embodiment of the present invention, because the used long training sequence is different from a long training sequence used in the prior art, herein, a process for generating a long training sequence symbol is mainly described in detail.

Specifically, when a quantity of subcarriers used in the system is greater than a quantity of elements in a long training sequence (or a sequence length), direct current carrier components may be set to 0. Afterward, subcarriers with "a quantity same as the quantity of elements in the long training sequence" are selected from non direct current carrier components, and the elements in the long training sequence are mapped to the selected subcarriers one by one. Finally, a specific numeric value or a cyclic shift element of the long training sequence is inserted in remaining subcarriers. For example, a numeric value "1" is inserted, used by the receiving device for channel estimation; or a numeric value "0" may be inserted, that is, no information is transmitted on the subcarriers.

When the quantity of subcarriers is equal to the quantity of elements in the long training sequence, one-to-one mapping may be performed on the elements in the long training sequence and the subcarriers, and afterward, the direct current carrier components may be set to 0.

When the quantity of subcarriers is less than the quantity of elements in the long training sequence, elements with "a quantity same as the quantity of subcarriers" may be selected from the elements in the long training sequence. Afterward, one-to-one mapping is performed on the selected elements and the subcarriers. Finally, the direct current carrier components are set to 0.

In this embodiment, the device A may determine a long training sequence symbol according to the long training sequence corresponding to the device B, and add the long training sequence symbol to a long training sequence field (field) at a physical layer of the data packet, and send the data packet to each receiving device.

It should be noted that in this embodiment, the "long training sequence symbol" refers to a valid bit (or a character string) in a long training sequence field of a transmitted data packet, and may be generated according to a long training sequence (for example, according to a preset rule). Therefore, a receiving device can determine, by parsing a long training sequence symbol, a long training sequence indicated by the long training sequence symbol. The foregoing method and process may be the same as or similar to those in the prior art, and herein, to avoid repetition, description thereof is omitted. The following omits description about the same or similar cases.

Optionally, when the first sub-identity information is a part of the identity information, the performing encapsulation processing on the data to generate a data packet includes: performing encapsulation processing on the data to generate the data packet, where a second sub-identity information symbol is carried at the physical layer of the data packet, where the second sub-identity information symbol is used to indicate second sub-identity information of the target receiving device, and the second sub-identity information belongs to a part, except the first sub-identity information, in the identity information.

Specifically, in this embodiment, in a case in which the first sub-identity information is a part of the identity information, one long training sequence can identify multiple devices, and a receiving device cannot accurately determine, according to only the long training sequence, whether the receiving device is a target receiving device of the data packet. Therefore, in this embodiment, a transmitting device may further determine, according to a preset rule, second sub-identity information in identity information of a target receiving device other than the first sub-identity information.

For example, the device A may use a part of information (for example, bits b24 to b32 in a MAC address), except the first sub-identity information (for example, bits b0 to b10 in the MAC address), in the MAC address of the device B as the second sub-identity information (hereinafter recorded as second sub-identity information B).

In this embodiment, to enable the receiving device to obtain the second sub-identity information of the target receiving device by performing physical layer parsing, the device A may add the second sub-identity information (or a symbol indicating the second sub-identity information) to available space at the physical layer of the data packet. Therefore, the device A may further determine the second sub-identity information (specifically, a length of the second sub-identity information) according to the available space at the physical layer of the data packet. For example, in a case of a Wi-Fi system of the IEEE 802.11ac standard, a partial association identifier field (field) of 9 bits is added to a signal field (signal field) at the physical layer of the data packet. Therefore, in this embodiment, the device A may use information of 9 bits (for example, bits b24 to b32 in the MAC address) in the MAC address of the device B other than the first sub-identity information (for example, bits b0 to b10 in the MAC address) as the second sub-identity information B.

It should be understood that the foregoing listed method for determining second sub-identity information is only for exemplary description, and the present invention is not limited thereto. For example, the second sub-identity information may be consecutive or inconsecutive bits in the identity information. For another example, the second sub-identity information may be all information, except the first sub-identity information, in the identity information.

It should be noted that in this embodiment, the methods for determining second sub-identity information by all devices in the system need to be consistent, so as to ensure that the second sub-identity information of the target receiving device determined by the transmitting device is consistent with the second sub-identity information determined by the target receiving device.

According to the data transmission method in this embodiment, by using a long training sequence symbol (or first sub-identity information) and a second sub-identity information symbol (or second sub-identity information) to jointly indicate a device in the system, more devices can be identified, which further improves an effect of the present invention.

After determining the second sub-identity information, the device A may generate a second sub-identity information symbol used to indicate the second sub-identity information of the device B, and add the second sub-identity information symbol to the physical layer of the data packet, so that the receiving device can obtain the second sub-identity information of the target receiving device by performing physical layer parsing.

Optionally, the second sub-identity information symbol is carried in a partial association identifier field at the physical layer of the data packet.

Specifically, in a case in which this embodiment is applied, for example, to a Wi-Fi system of the IEEE 802.11ac standard, a partial association identifier field (field) of 9 bits is added to a signal field (signal field) at a physical layer of a data packet, and the foregoing generated second sub-identity information symbol may be carried in the partial association identifier field. Alternatively, the second sub-identity information may be used as a partial association identifier.

It should be understood that the foregoing listed method for carrying second sub-identity information (or a second sub-identity information symbol) is only for exemplary description, and the present invention is not limited thereto. Other methods that can enable the receiving device to acquire the second sub-identity information from the physical layer (or other layers before the physical layer in a parsing order) all fall within the protection scope of the present invention.

It should be noted that in this embodiment, the "second sub-identity information symbol" refers to, for example, a valid bit (or a character string) in a partial association identifier field of a transmitted data packet, and may be generated according to second sub-identity information (for example, according to a preset rule). Therefore, a receiving device can determine, by parsing a second sub-identity information symbol, second sub-identity information indicated by the second sub-identity information symbol. The foregoing method and process may be the same as or similar to those in the prior art, and herein, to avoid repetition, description thereof is omitted. The following omits description about the same or similar cases.

In addition, in this embodiment, in a transmission order, the second sub-identity information symbol may be located before the long training sequence symbol, or may be located behind the long training sequence symbol, which is not particularly limited in the present invention.

In addition, other processes for generating a data packet may be similar to those in the prior art, and herein, to avoid repetition, description thereof is omitted.

Table 1 below shows an example of a part (second sub-identity information) of identity information of a target receiving device carried in a partial association identifier field of a data packet and a part (first sub-identity information) of the identity information that is of the target receiving device and is corresponding to a long training sequence field.

TABLE 1

| Case | Partial association identifier field (carrying) | Long training sequence field (corresponding) |
|---|---|---|
| Transmitting to an AP | Bits 24 to 32 of a MAC address | Bits 0 to 10 MAC address |
| Transmitting to a STA | Bits 24 to 32 of a MAC address | Bits 0 to 10 MAC address |

Table 2 below shows another example of a part (second sub-identity information) of identity information of a target receiving device carried in a partial association identifier field of a data packet and a part (first sub-identity information) of the identity information that is of the target receiving device and is corresponding to a long training sequence field.

TABLE 2

| Case | Partial association identifier field (carrying) | Long training sequence field (corresponding) |
|---|---|---|
| Transmitting to an AP | Bits 39 to 47 of a BSSID | Bits 28 to 38 of the BSSID |
| Transmitting to a STA | Bits 39 to 47 of a receive (RA, Receive address) | Bits 28 to 38 of the RA |

Table 3 below shows still another example of a part (second sub-identity information) of identity information of a target receiving device carried in a partial association identifier field of a data packet and a part (first sub-identity information) of the identity information of the target receiving device corresponding to a long training sequence field.

TABLE 3

| Case | Partial association identifier field (carrying) | Long training sequence field (corresponding) |
|---|---|---|
| Transmitting to an AP | Bits 15 to 23 of a MAC address | Bits 35 to 45 of the MAC address |
| Transmitting to a STA | Bits 15 to 23 of a MAC address | Bits 35 to 45 of the MAC address |

As described above, by using the partial association identifier field and the long training sequence field to jointly identify user equipment in the system, multiple devices can be identified. For example, in a case in which a system bandwidth is 20 MHz, if a quantity of available subcarriers in the system is 53, and therefore, more than $2^{11}$ long training sequences may be generated and can correspond to $2^{11}$ devices. In addition, the partial association identifier field includes 9 bits, which can correspond to $2^9$ devices. Therefore, by combining the partial association identifier field and the long training sequence field (20 bits in total), $2^{11} \times 2^9 = 2^{20}$ devices can be identified.

In S150, the device A, for example, may send the data packet to each device (including the device B) in the system in a broadcast manner over an air interface. In this embodiment, the method and process for sending a data packet may be the same as those in the prior art, and herein, to avoid repetition, description thereof is omitted.

A device (hereinafter for ease of understanding and description, unless otherwise specified, a device C is used as an example for describing an action of the receiving device) that can receive the data packet, same as the device A, may predetermine a long training sequence set including multiple long training sequences. In addition, the process is the same as the foregoing process for determining a long training sequence set by the device A, and herein, to avoid repetition, description thereof is omitted.

Afterward, the device C may determine the mapping relationship between the foregoing acquired long training sequence set C' and each terminal device (including the device C) in the system. In addition, the process is the same as the foregoing process for determining the mapping relationship by the device A, and herein, to avoid repetition, description thereof is omitted.

When receiving the data packet sent by the device A, the device C may acquire, from the physical layer of the data packet, the long training sequence B determined by the device A according to the target receiving device (that is, the device B). Therefore, the device C may perform receiving processing on the data packet according to the long training sequence B.

As the receiving processing performed according to the long training sequence B, the following processes may be listed.

When the first sub-identity information is all of the identity information, the long training sequence B corresponds to only one receiving device (that is, case 1). When the first sub-identity information is a part of the identity information, the long training sequence B may correspond to multiple receiving devices (that is, case 2). The following describes the receiving processing process in the foregoing two cases separately.

Case 1

For example, after determining the mapping relationship between the long training sequence set C' and each terminal device in the system, the device C may determine a long training sequence (hereinafter recorded as a long training sequence C) corresponding to the device C.

Therefore, whether the long training sequence C is consistent with the long training sequence B may be determined.

Herein, it should be noted that in a case in which a polyphase perfect sequence (for example, a Zadoff-Chu sequence) is used as a long training sequence, ideal auto-correlation properties and optimum cross-correlation properties of the polyphase perfect sequence may be used to quickly and conveniently distinguish whether the long training sequence C is consistent with the long training sequence B.

Specifically, the device C may perform correlation calculation on the long training sequence C and the long training sequence B according to the formula 4 below:

$$R_{r,s}(\tau) = \sum_{n=0}^{N-1} \hat{a}_n^{(r)} \hat{a}_{n+\tau}^{*(s)} \qquad \text{Formula 4}$$

N indicates a sequence length.

Figure 3:
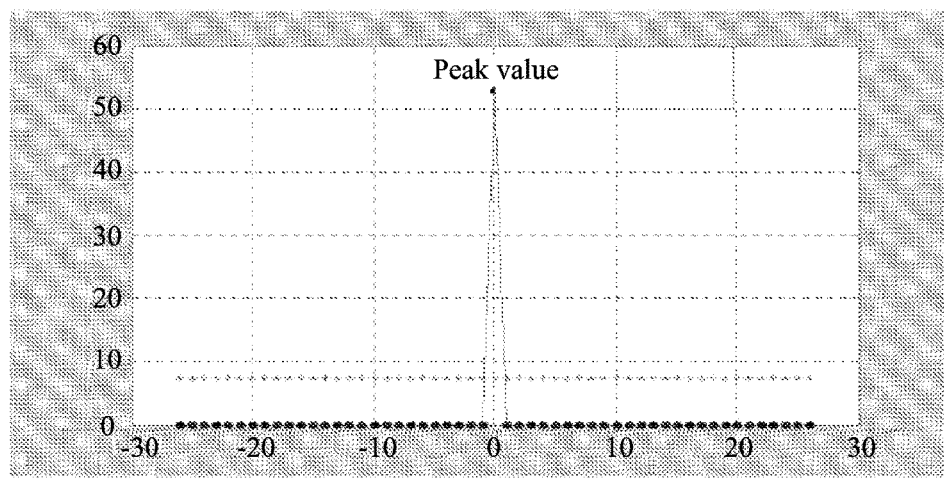
FIG. 3 is a line graph of an autocorrelation function and a cross-correlation function of a Zadoff-Chu sequence.

FIG. 3 is a line graph of an autocorrelation function and a cross-correlation function of a Zadoff-Chu sequence. As shown in FIG. 3, if the long training sequence C is consistent with the long training sequence B, a peak value may occur. Therefore, the device C may determine, according to whether the peak value occurs or whether a correlation value $R_{r,s}(\tau)$ exceeds a threshold, whether the long training sequence C is consistent with the long training sequence B.

It should be understood that the foregoing listed method for determining whether the long training sequence C is consistent with the long training sequence B is only for exemplary description, and the present invention is not limited thereto. For example, the long training sequence C may be compared with the long training sequence B bit by bit to determine whether the long training sequence C is consistent with the long training sequence B.

Therefore, if the long training sequence C is inconsistent with the long training sequence B, the device C may determine that the device C is not the target receiving device of the data packet, and therefore may, for example, discard the data packet.

If the long training sequence C is consistent with the long training sequence B, the device C may determine that the device C is the target receiving device of the data packet, and therefore may, for example, parse the data packet to acquire the data that needs to be sent by the device A.

For another example, when receiving the data packet sent by the device A, the device C may acquire, from the physical layer of the data packet, the long training sequence B determined by the device A according to the target receiving device (that is, the device B), and find, according to the foregoing determined mapping relationship, first sub-identity information of a device (herein, the device B) corresponding to the long training sequence B.

If the first sub-identity information of the device B is inconsistent with first sub-identity information of the device C, the device C may determine that the device C is not the target receiving device of the data packet, and therefore may, for example, discard the data packet.

If the first sub-identity information of the device B is consistent with first sub-identity information of the device C, the device C may determine that the device C is the target receiving device of the data packet, and therefore may, for example, parse the data packet to acquire the data that needs to be sent by the device A.

Case 2

In this case, the device C may determine second sub-identity information (hereinafter recorded as second sub-identity information C) of the device C according to a preset rule (consistent with the preset rule used by the device A to determine second sub-identity information). In addition, the process is the same as the foregoing process for determining the second sub-identity information by the device A, and herein, to avoid repetition, description thereof is omitted.

Afterward, for example, after determining the mapping relationship between the long training sequence set C' and each terminal device in the system, the device C may determine a long training sequence (hereinafter recorded as a long training sequence C) corresponding to the device C.

Therefore, whether the long training sequence C is consistent with the long training sequence B may be determined.

Herein, it should be noted that in a case in which a polyphase perfect sequence (for example, a Zadoff-Chu sequence) is used as a long training sequence, ideal auto-correlation properties and optimum cross-correlation properties of the polyphase perfect sequence may be used to quickly and conveniently distinguish whether the long training sequence C is consistent with the long training sequence B.

Specifically, the device C may perform correlation calculation on the long training sequence C and the long training sequence B according to the foregoing formula 4. If the long training sequence C is consistent with the long training sequence B, a peak value may occur. Therefore, the device C may determine, according to whether the peak value occurs or whether a correlation value $R_{r,\,c}(\tau)$ exceeds a threshold, whether the long training sequence C is consistent with the long training sequence B.

It should be understood that the foregoing listed method for determining whether the long training sequence C is consistent with the long training sequence B is only for exemplary description, and the present invention is not limited thereto. For example, the long training sequence C may be compared with the long training sequence B bit by bit to determine whether the long training sequence C is consistent with the long training sequence B.

Therefore, if the long training sequence C is inconsistent with the long training sequence B, the device C may determine that the device C is not the target receiving device of the data packet, and therefore may, for example, discard the data packet.

Because the first sub-identity information is only a part of the identity information, that is, one piece of first sub-identity information may be corresponding to multiple devices, if the long training sequence C is consistent with the long training sequence B, the device C may determine that the device C may be the target receiving device of the data packet, and therefore may continue to parse the data packet to acquire the second sub-identity information (that is, the second sub-identity information B) of the target receiving device from the physical layer of the data packet.

Therefore, if the second sub-identity information B is inconsistent with the second sub-identity information C, the device C may determine that the device C is not the target receiving device of the data packet, and therefore may, for example, discard the data packet.

If the second sub-identity information B is consistent with the second sub-identity information C, the device C may determine that the device C is the target receiving device of the data packet, and therefore may, for example, parse the data packet to acquire the data that needs to be sent by the device A.

For another example, when receiving the data packet sent by the device A, the device C may acquire, from the physical layer of the data packet, the long training sequence B determined by the device A according to the target receiving device (that is, the device B), and find, according to the foregoing determined mapping relationship, first sub-identity information of a device (herein, the device B) corresponding to the long training sequence B.

If the first sub-identity information of the device B is inconsistent with first sub-identity information of the device C, the device C may determine that the device C is not the target receiving device of the data packet, and therefore may, for example, discard the data packet.

Because the first sub-identity information is only a part of the identity information, that is, one piece of first sub-identity information may be corresponding to multiple devices, if the first sub-identity information of the device B is consistent with the first sub-identity information of the device C, the device C may determine that the device C may be the target receiving device of the data packet, and therefore may continue to parse the data packet to acquire the second sub-identity information (that is, the second sub-identity information B) of the target receiving device from the physical layer of the data packet.

Therefore, if the second sub-identity information B is inconsistent with the second sub-identity information C, the device C may determine that the device C is not the target receiving device of the data packet, and therefore may, for example, discard the data packet.

If the second sub-identity information B is consistent with the second sub-identity information C, the device C may determine that the device C is the target receiving device of the data packet, and therefore may, for example, parse the data packet to acquire the data that needs to be sent by the device A.

Case B

Optionally, in this embodiment, the target receiving device is all receiving devices in the communications system, and the selecting a target long training sequence from the long training sequence set according to first sub-identity information of the target receiving device and the mapping relationship includes: selecting, from the long training sequence set according to the first sub-identity information of the target receiving device and the mapping relationship, a third long training sequence corresponding to first sub-identity information of all the receiving devices in the communications system as the target long training sequence.

Specifically, if the device A needs to send a data packet to each receiving device in the system, or in a case in which each receiving device in the system is a target receiving device of the data packet, the device A may select a long training sequence (a third long training sequence) from the determined long training sequence set according to a preset rule, for example, the first or the last long training sequence in the long training sequence set, and use the long training sequence as the target long training sequence, to identify that the target receiving device of the data packet is all the receiving devices in the system.

Each receiving device in the system may determine the third long training sequence according to the preset rule (same as the rule used by the device A). In a case in which the target long training sequence carried in the data packet is the third long training sequence, it indicates that the data is broadcast data and therefore may be received.

According to the data transmission method in this embodiment when a transmitting device needs to transmit data to a target receiving device, the transmitting device selects, from a long training sequence set, a target long training sequence corresponding to the target receiving device, and adds the target long training sequence to a long training sequence field at a physical layer of a generated data packet, so that a receiving device can determine the target receiving device of the data packet according to the target long training sequence. Therefore, in a case in which the receiving device is not the target receiving device of the data packet, the receiving device does not need to continue to parse the data packet, which can reduce burden of the receiving device, reduce waste of hardware resources, and improve user experience.

Figure 4:
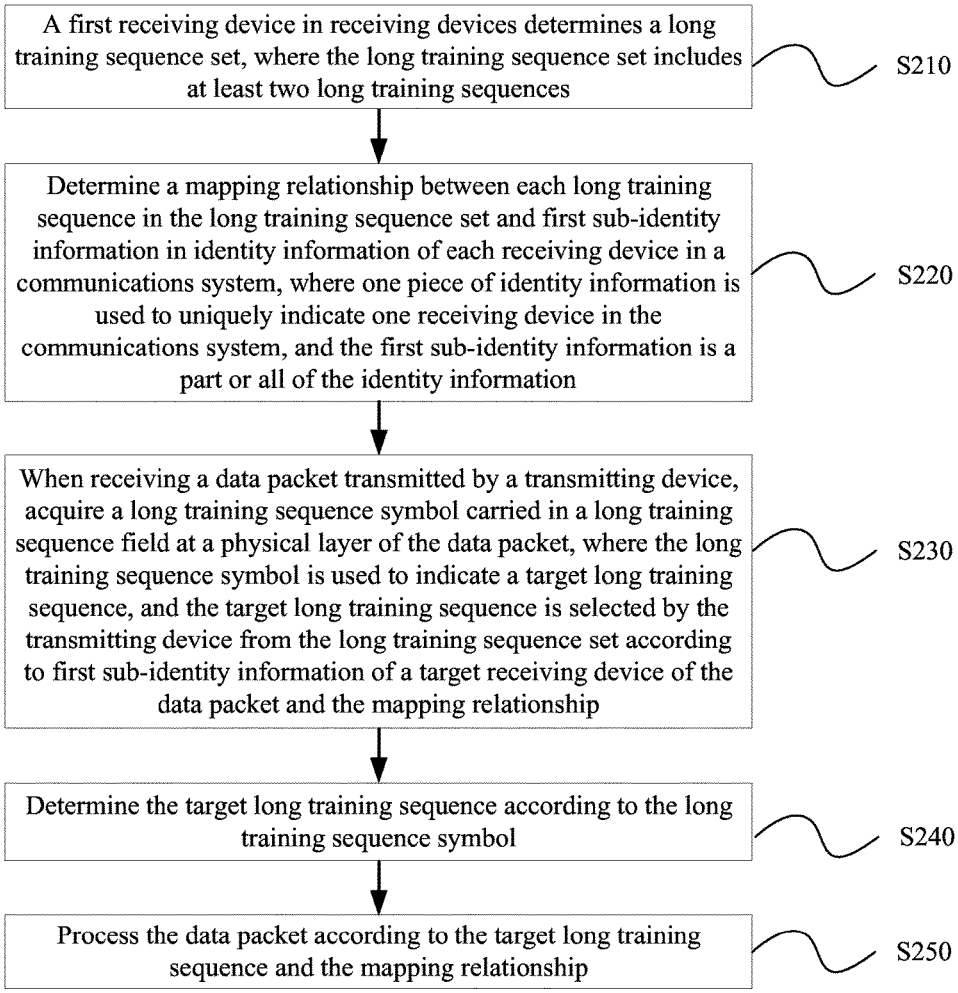
FIG. 4 is a schematic flowchart of a data transmission method according to another embodiment.

FIG. 4 shows a schematic flowchart of a data transmission method 200 according to an embodiment described from a perspective of a receiving device. As shown in FIG. 4, the method 200 includes the following steps.

S210. A first receiving device in receiving devices determines a long training sequence set, where the long training sequence set includes at least two long training sequences.

S220. Determine a mapping relationship between each long training sequence in the long training sequence set and first sub-identity information in identity information of each receiving device in a communications system, where one piece of identity information is used to uniquely indicate one receiving device in the communications system, and the first sub-identity information is a part or all of the identity information.

S230. When receiving a data packet transmitted by a transmitting device, acquire a long training sequence symbol carried in a long training sequence field at a physical layer of the data packet, where the long training sequence symbol is used to indicate a target long training sequence, and the target long training sequence is selected by the transmitting device from the long training sequence set according to first sub-identity information of a target receiving device of the data packet and the mapping relationship.

S240. Determine the target long training sequence according to the long training sequence symbol.

S250. Process the data packet according to the target long training sequence and the mapping relationship.

In the prior art, a long training sequence (LTS) is used for channel estimation, and in addition, in a same communications system, long training sequences used by various user equipment (including a receiving device and a transmitting device) are the same.

In contrast, in this embodiment, the communications system may use multiple (at least two) LTSs that are mutually different. In addition, for example, different LTSs may be allocated to different user equipment. When the transmitting device needs to transmit data to a target receiving device, the transmitting device may determine a target LTS corresponding to the target receiving device (in other words, allocated by the system to the target receiving device), and add the target LTS to a long training field (LTF, also referred to as a long training sequence field) at a physical layer of a data packet. Therefore, the receiving device may acquire the target LTS from the LTF of the data packet; and may perform receiving processing (for example, receiving or discarding) on the data packet according to a relationship between the LTS allocated by the system to the receiving device and the target LTS (for example, same or different), or may determine, according to the target LTS, a target receiving device corresponding to the target LTS (specifically, first sub-identity information of the target receiving device, where the parameter is described later in detail), and perform receiving processing (for example, receiving or discarding) on the data packet according to a relationship between first sub-identity information of the receiving device and the first sub-identity information of the target receiving device (for example, same or different). Therefore, the receiving device acquires, by parsing the LTF at the physical layer of the data packet, the target LTS carried in the LTF, and can confirm, by using the target LTS, whether the receiving device is the target receiving device of the data packet, which can reduce burden of the receiving device, reduce waste of hardware resources, and improve user experience.

Specifically, in S210, a device C (an example of the first receiving device, for example, may be an AP or a STA) in the communications system may predetermine a long training sequence set including multiple long training sequences (LTS).

In this embodiment, the long training sequence set may be generated by each device itself (including the receiving device and the transmitting device) in the system according to a preset rule, or may be generated, according to a preset rule, by an external device independent of the receiving device and the transmitting device and delivered to each device (including the receiving device and the transmitting device) in the system. For ease of understanding and description, the following uses the device C as an execution entity to describe a method and process for generating a long training sequence set.

Optionally, the long training sequence is a sequence with good correlation properties.

The sequence with good correlation properties is any one of the following sequences: a polyphase perfect sequence, a Gold sequence, a Gold-like sequence, and a pseudo-random sequence, for example, an m sequence.

In addition, the polyphase perfect sequence is any one of the following sequences: a Zadoff-Chu sequence, a Frank sequence, a Combined Frank/Zadoff-Chu sequence, and the like.

Specifically, currently, a great progress is made in the sequence design field, and people's research emphasis has shifted from a binary pseudo-random sequence to a sequence with good correlation properties such as a polyphase perfect sequence. Because the sequence with good correlation properties has good autocorrelation properties and cross-correlation properties, in this embodiment of the present invention, the sequence with good correlation properties may be used as the multiple LTSs. Therefore, the receiving device may use the good autocorrelation properties and cross-correlation properties of the LTS to accurately determine whether the LTS allocated by the system to the receiving device is consistent with the LTS carried in the data packet, and therefore, can determine whether the receiving device is the target receiving device of the data packet (this process is described later in detail). In addition, by using, for example, the polyphase perfect sequence, properties (for example, a generation formula) of the polyphase perfect sequence can be used to generate multiple LTSs quickly and conveniently and determine a mapping relationship between the multiple LTSs and receiving devices (specifically, first sub-identity information of each receiving device) (this process is described later in detail).

The sequences with good correlation properties may include: a polyphase perfect sequence, a Gold sequence, a Gold-like sequence, and a pseudo-random sequence with good correlation properties, for example, an m sequence. Herein, properties, concepts, and the like of the polyphase perfect sequence, the Gold sequence, and the pseudo-random sequence may be similar to those in the prior art, and herein, to avoid repetition, description thereof is omitted. In addition, it should be noted that the foregoing listed sequences used as sequences with good correlation properties are only for exemplary description, and the present invention is not limited thereto. Other sequences with good correlation properties all fall within the protection scope of the present invention.

The polyphase perfect sequence may be: a Zadoff-Chu sequence, a Frank sequence, a Combined Frank/Zadoff-Chu sequence, or the like. Herein, properties, concepts, and the like of the Zadoff-Chu sequence, the Frank sequence, or the Combined Frank/Zadoff-Chu sequence may be similar to those in the prior art (for example, a sequence length of the Frank sequence can be only a square of a natural number), and herein, to avoid repetition, description thereof is omitted. In addition, it should be noted that the foregoing listed sequences used as polyphase perfect sequences are only for exemplary description, and the present invention is not limited thereto. Other sequences that can be used as polyphase perfect sequences, that is, sequences that have ideal autocorrelation properties and optimum cross-correlation properties, all fall within the protection scope of the present invention. For ease of understanding and description, the following uses an example in which the Zadoff-Chu sequence is used as a long training sequence to describe a process for generating a long training sequence set in this embodiment of the present invention.

In this embodiment, a long training sequence set with multiple LTSs may be generated according to the properties of the polyphase perfect sequence (herein, specifically properties of the Zadoff-Chu sequence) by using a conventional Zadoff-Chu sequence generation formula.

For example, a length of the Zadoff-Chu sequence may be set according to a preset rule, and a basic long training sequence set C may be determined according to the determined sequence length and the foregoing formula 1.

Optionally, a length of the long training sequence is determined according to a quantity of available subcarriers in the communications system.

Specifically, in this embodiment, the long training sequence is used for channel estimation; therefore, for example, if the length of the long training sequence is equal to the quantity of available subcarriers in the communications system, elements in the long training sequence can be in one-to-one correspondence with the subcarriers, and therefore, accuracy of channel estimation is improved.

First, the device C may determine a system bandwidth. For example, the device C may acquire a bandwidth parameter (CH_BANDWIDTH) from a transceiver (TRX), determine the system bandwidth according to the bandwidth parameter, and further determine the quantity of available subcarriers in the system. For example, in a Wi-Fi system of the IEEE 802.11g standard, when a system bandwidth is 20 megahertz (MHz), the quantity of available subcarriers in the system is 53.

As described above, when the Zadoff-Chu sequence is selected, a quantity of sequences included in the sequence set can be as large as possible if the sequence length is less than or equal to a maximum prime number of a quantity of subcarriers, and therefore a quantity of represented receiving devices can be increased. The following uses an example in which the sequence length is set to 53 for description.

In a case in which the sequence length is set to 53 (that is, N=53), the following basic long training sequence set C may be generated according to the foregoing formula 1:
$C=\{â^{(1)}, \ldots, â^{(r)}, \ldots, â^{(52)}\}$, $r=\{1, 2, \ldots, 52\}$, where
a(1)={0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0}
a(2)={0, 4, 12, 24, 40, 60, 84, 6, 38, 74, 8, 52, 100, 46, 102, 56, 14, 82, 48, 18, 98, 76, 58, 44, 34, 28, 26, 28, 34, 44, 58, 76, 98, 18, 48, 82, 14, 56, 102, 46, 100, 52, 8, 74, 38, 6, 84, 60, 40, 24, 12, 4, 0}
a(3)={0, 6, 18, 36, 60, 90, 20, 62, 4, 58, 12, 78, 44, 16, 100, 84, 74, 70, 72, 80, 94, 8, 34, 66, 104, 42, 92, 42, 104, 66, 34, 8, 94, 80, 72, 70, 74, 84, 100, 16, 44, 78, 12, 58, 4, 62, 20, 90, 60, 36, 18, 6, 0}
a(4)={0, 8, 24, 48, 80, 14, 62, 12, 76, 42, 16, 104, 94, 92, 98, 6, 28, 58, 96, 36, 90, 46, 10, 88, 68, 56, 52, 56, 68, 88, 10, 46, 90, 36, 96, 58, 28, 6, 98, 92, 94, 104, 16, 42, 76, 12, 62, 14, 80, 48, 24, 8, 0}
a(5)={0, 10, 30, 60, 100, 44, 104, 68, 42, 26, 20, 24, 38, 62, 96, 34, 88, 46, 14, 98, 86, 84, 92, 4, 32, 70, 12, 70, 32, 4, 92, 84, 86, 98, 14, 46, 88, 34, 96, 62, 38, 24, 20, 26, 42, 68, 104, 44, 100, 60, 30, 10, 0}
a(6)={0, 12, 36, 72, 14, 74, 40, 18, 8, 10, 24, 50, 88, 32, 94, 62, 42, 34, 38, 54, 82, 16, 68, 26, 102, 84, 78, 84, 102, 26, 68, 16, 82, 54, 38, 34, 42, 62, 94, 32, 88, 50, 24, 10, 8, 18, 40, 74, 14, 72, 36, 12, 0} a(7)={0, 14, 42, 84, 34, 104, 82, 74, 80, 100, 28, 76, 32, 2, 92, 90, 102, 22, 62, 10, 78, 54, 44, 48, 66, 98, 38, 98, 66, 48, 44, 54, 78, 10, 62, 22, 102, 90, 92, 2, 32, 76, 28, 100, 80, 74, 82, 104, 34, 84, 42, 14, 0} a(8)={0, 16, 48, 96, 54, 28, 18, 24, 46, 84, 32, 102, 82, 78, 90, 12, 56, 10, 86, 72, 74, 92, 20, 70, 30, 6, 104, 6, 30, 70, 20, 92, 74, 72, 86, 10, 56, 12, 90, 78, 82, 102, 32, 84, 46, 24, 18, 28, 54, 96, 48, 16, 0} a(9)={0, 18, 54, 2, 74, 58, 60, 80, 12, 68, 36, 22, 26, 48, 88, 40, 10, 104, 4, 28, 70, 24, 102, 92, 100, 20, 64, 20, 100, 92, 102, 24, 70, 28, 4, 104, 10, 40, 88, 48, 26, 22, 36, 68, 12, 80, 60, 58, 74, 2, 54, 18, 0} a(10)={0, 20, 60, 14, 94, 88, 102, 30, 84, 52, 40, 48, 76, 18, 86, 68, 70, 92, 28, 90, 66, 62, 78, 8, 64, 34, 24, 34, 64, 8, 78, 62, 66, 90, 28, 92, 70, 68, 86, 18, 76, 48, 40, 52, 84, 30, 102, 88, 94, 14, 60, 20, 0} a(11)={0, 22, 66, 26, 8, 12, 38, 86, 50, 36, 44, 74, 20, 94, 84, 96, 24, 80, 52, 46, 62, 100, 54, 30, 28, 48, 90, 48, 28, 30, 54, 100, 62, 46, 52, 80, 24, 96, 84, 94, 20, 74, 44, 36, 50, 86, 38, 12, 8, 26, 66, 22, 0} a(12)={0, 24, 72, 38, 28, 42, 80, 36, 16, 20, 48, 100, 70, 64, 82, 18, 84, 68, 76, 2, 58, 32, 30, 52, 98, 62, 50, 62, 98, 52, 30, 32, 58, 2, 76, 68, 84, 18, 82, 64, 70, 100, 48, 20, 16, 36, 80, 42, 28, 38, 72, 24, 0} a(13)={0, 26, 78, 50, 48, 72, 16, 92, 88, 4, 52, 20, 14, 34, 80, 46, 38, 56, 100, 64, 54, 70, 6, 74, 62, 76, 10, 76, 62, 74, 6, 70, 54, 64, 100, 56, 38, 46, 80, 34, 14, 20, 52, 4, 88, 92, 16, 72, 48, 50, 78, 26, 0} a(14)={0, 28, 84, 62, 68, 102, 58, 42, 54, 94, 56, 46, 64, 4, 78, 74, 98, 44, 18, 20, 50, 2, 88, 96, 26, 90, 76, 90, 26, 96, 88, 2, 50, 20, 18, 44, 98, 74, 78, 4, 64, 46, 56, 94, 54, 42, 58, 102, 68, 62, 84, 28, 0} a(15)={0, 30, 90, 74, 88, 26, 100, 98, 20, 78, 60, 72, 8, 80, 76, 102, 52, 32, 42, 82, 46, 40, 64, 12, 96, 104, 36, 104, 96, 12, 64, 40, 46, 82, 42, 32, 52, 102, 76, 80, 8, 72, 60, 78, 20, 98, 100, 26, 88, 74, 90, 30, 0} a(16)={0, 32, 96, 86, 2, 56, 36, 48, 92, 62, 64, 98, 58, 50, 74, 24, 6, 20, 66, 38, 42, 78, 40, 34, 60, 12, 102, 12, 60, 34, 40, 78, 42, 38, 66, 20, 6, 24, 74, 50, 58, 98, 64, 62, 92, 48, 36, 56, 2, 86, 96, 32, 0} a(17)={0, 34, 102, 98, 22, 86, 78, 104, 58, 46, 68, 18, 2, 20, 72, 52, 66, 8, 90, 100, 38, 10, 16, 56, 24, 26, 62, 26, 24, 56, 16, 10, 38, 100, 90, 8, 66, 52, 72, 20, 2, 18, 68, 46, 58, 104, 78, 86, 22, 98, 102, 34, 0} a(18)={0, 36, 2, 4, 42, 10, 14, 54, 24, 30, 72, 44, 52, 96, 70, 80, 20, 102, 8, 56, 34, 48, 98, 78, 94, 40, 22, 40, 94, 78, 98, 48, 34, 56, 8, 102, 20, 80, 70, 96, 52, 44, 72, 30, 24, 54, 14, 10, 42, 4, 2, 36, 0} a(19)={0, 38, 8, 16, 62, 40, 56, 4, 96, 14, 76, 70, 102, 66, 68, 2, 80, 90, 32, 12, 30, 86, 74, 100, 58, 54, 88, 54, 58, 100, 74, 86, 30, 12, 32, 90, 80, 2, 68, 66, 102, 70, 76, 14, 96, 4, 56, 40, 62, 16, 8, 38, 0} a(20)={0, 40, 14, 28, 82, 70, 98, 60, 62, 104, 80, 96, 46, 36, 66, 30, 34, 78, 56, 74, 26, 18, 50, 16, 22, 68, 48, 68, 22, 16, 50, 18, 26, 74, 56, 78, 34, 30, 66, 36, 46, 96, 80, 104, 62, 60, 98, 70, 82, 28, 14, 40, 0} a(21)={0, 42, 20, 40, 102, 100, 34, 10, 28, 88, 84, 16, 96, 6, 64, 58, 94, 66, 80, 30, 22, 56, 26, 38, 92, 82, 8, 82, 92, 38, 26, 56, 22, 30, 80, 66, 94, 58, 64, 6, 96, 16, 84, 88, 28, 10, 34, 100, 102, 40, 20, 42, 0} a(22)={0, 44, 26, 52, 16, 24, 76, 66, 100, 72, 88, 42, 40, 82, 62, 86, 48, 54, 104, 92, 18, 94, 2, 60, 56, 96, 74, 96, 56, 60, 2, 94, 18, 92, 104, 54, 48, 86, 62, 82, 40, 42, 88, 72, 100, 66, 76, 24, 16, 52, 26, 44, 0} a(23)={0, 46, 32, 64, 36, 54, 12, 16, 66, 56, 92, 68, 90, 52, 60, 8, 2, 42, 22, 48, 14, 26, 84, 82, 20, 4, 34, 4, 20, 82, 84, 26, 14, 48, 22, 42, 2, 8, 60, 52, 90, 68, 92, 56, 66, 16, 12, 54, 36, 64, 32, 46, 0} a(24)={0, 48, 38, 76, 56, 84, 54, 72, 32, 40, 96, 94, 34, 22, 58, 36, 62, 30, 46, 4, 10, 64, 60, 104, 90, 18, 100, 18, 90, 104, 60, 64, 10, 4, 46, 30, 62, 36, 58, 22, 34, 94, 96, 40, 32, 72, 54, 84, 56, 76, 38, 48, 0} a(25)={0, 50, 44, 88, 76, 8, 96, 22, 104, 24, 100, 14, 84, 98, 56, 64, 16, 18, 70, 66, 6, 102, 36, 20, 54, 32, 60, 32, 54, 20, 36, 102, 6, 66, 70, 18, 16, 64, 56, 98, 84, 14, 100, 24, 104, 22, 96, 8, 76, 88, 44, 50, 0} a(26)={0, 52, 50, 100, 96, 38, 32, 78, 70, 8, 104, 40, 28, 68, 54, 92, 76, 6, 94, 22, 2, 34, 12, 42, 18, 46, 20, 46, 18, 42, 12, 34, 2, 22, 94, 6, 76, 92, 54, 68, 28, 40, 104, 8, 70, 78, 32, 38, 96, 100, 50, 52, 0} a(27)={0, 54, 56, 6, 10, 68, 74, 28, 36, 98, 2, 66, 78, 38, 52, 14, 30, 100, 12, 84, 104, 72, 94, 64, 88, 60, 86, 60, 88, 64, 94, 72, 104, 84, 12, 100, 30, 14, 52, 38, 78, 66, 2, 98, 36, 28, 74, 68, 10, 6, 56, 54, 0} a(28)={0, 56, 62, 18, 30, 98, 10, 84, 2, 82, 6, 92, 22, 8, 50, 42, 90, 88, 36, 40, 100, 4, 70, 86, 52, 74, 46, 74, 52, 86, 70, 4, 100, 40, 36, 88, 90, 42, 50, 8, 22, 92, 6, 82, 2, 84, 10, 98, 30, 18, 62, 56, 0} a(29)={0, 58, 68, 30, 50, 22, 52, 34, 74, 66, 10, 12, 72, 84, 48, 70, 44, 76, 60, 102, 96, 42, 46, 2, 16, 88, 6, 88, 16, 2, 46, 42, 96, 102, 60, 76, 44, 70, 48, 84, 72, 12, 10, 66, 74, 34, 52, 22, 50, 30, 68, 58, 0} a(30)={0, 60, 74, 42, 70, 52, 94, 90, 40, 50, 14, 38, 16, 54, 46, 98, 104, 64, 84, 58, 92, 80, 22, 24, 86, 102, 72, 102, 86, 24, 22, 80, 92, 58, 84, 64, 104, 98, 46, 54, 16, 38, 14, 50, 40, 90, 94, 52, 70, 42, 74, 60, 0} a(31)={0, 62, 80, 54, 90, 82, 30, 40, 6, 34, 18, 64, 66, 24, 44, 20, 58, 52, 2, 14, 88, 12, 104, 46, 50, 10, 32, 10, 50, 46, 104, 12, 88, 14, 2, 52, 58, 20, 44, 24, 66, 64, 18, 34, 6, 40, 30, 82, 90, 54, 80, 62, 0} a(32)={0, 64, 86, 66, 4, 6, 72, 96, 78, 18, 22, 90, 10, 100, 42, 48, 12, 40, 26, 76, 84, 50, 80, 68, 14, 24, 98, 24, 14, 68, 80, 50, 84, 76, 26, 40, 12, 48, 42, 100, 10, 90, 22, 18, 78, 96, 72, 6, 4, 66, 86, 64, 0} a(33)={0, 66, 92, 78, 24, 36, 8, 46, 44, 2, 26, 10, 60, 70, 40, 76, 72, 28, 50, 32, 80, 88, 56, 90, 84, 38, 58, 38, 84, 90, 56, 88, 80, 32, 50, 28, 72, 76, 40, 70, 60, 10, 26, 2, 44, 46, 8, 36, 24, 78, 92, 66, 0} a(34)={0, 68, 98, 90, 44, 66, 50, 102, 10, 92, 30, 36, 4, 40, 38, 104, 26, 16, 74, 94, 76, 20, 32, 6, 48, 52, 18, 52, 48, 6, 32, 20, 76, 94, 74, 16, 26, 104, 38, 40, 4, 36, 30, 92, 10, 102, 50, 66, 44, 90, 98, 68, 0} a(35)={0, 70, 104, 102, 64, 96, 92, 52, 82, 76, 34, 62, 54, 10, 36, 26, 86, 4, 98, 50, 72, 58, 8, 28, 12, 66, 84, 66, 12, 28, 8, 58, 72, 50, 98, 4, 86, 26, 36, 10, 54, 62, 34, 76, 82, 52, 92, 96, 64, 102, 104, 70, 0} a(36)={0, 72, 4, 8, 84, 20, 28, 2, 48, 60, 38, 88, 104, 86, 34, 54, 40, 98, 16, 6, 68, 96, 90, 50, 82, 80, 44, 80, 82, 50, 90, 96, 68, 6, 16, 98, 40, 54, 34, 86, 104, 88, 38, 60, 48, 2, 28, 20, 84, 8, 4, 72, 0} a(37)={0, 74, 10, 20, 104, 50, 70, 58, 14, 44, 42, 8, 48, 56, 32, 82, 100, 86, 40, 68, 64, 28, 66, 72, 46, 94, 4, 94, 46, 72, 66, 28, 64, 68, 40, 86, 100, 82, 32, 56, 48, 8, 42, 44, 14, 58, 70, 50, 104, 20, 10, 74, 0} a(38)={0, 76, 16, 32, 18, 80, 6, 8, 86, 28, 46, 34, 98, 26, 30, 4, 54, 74, 64, 24, 60, 66, 42, 94, 10, 2, 70, 2, 10, 94, 42, 66, 60, 24, 64, 74, 54, 4, 30, 26, 98, 34, 46, 28, 86, 8, 6, 80, 18, 32, 16, 76, 0} a(39)={0, 78, 22, 44, 38, 4, 48, 64, 52, 12, 50, 60, 42, 102, 28, 32, 8, 62, 88, 86, 56, 104, 18, 10, 80, 16, 30, 16, 80, 10, 18, 104, 56, 86, 88, 62, 8, 32, 28, 102, 42, 60, 50, 12, 52, 64, 48, 4, 38, 44, 22, 78, 0} a(40)={0, 80, 28, 56, 58, 34, 90, 14, 18, 102, 54, 86, 92, 72, 26, 60, 68, 50, 6, 42, 52, 36, 100, 32, 44, 30, 96, 30, 44, 32, 100, 36, 52, 42, 6, 50, 68, 60, 26, 72, 92, 86, 54, 102, 18, 14, 90, 34, 58, 56, 28, 80, 0} a(41)={0, 82, 34, 68, 78, 64, 26, 70, 90, 86, 58, 6, 36, 42, 24, 88, 22, 38, 30, 104, 48, 74, 76, 54, 8, 44, 56, 44, 8, 54, 76, 74, 48, 104, 30, 38, 22, 88, 24, 42, 36, 6, 58, 86, 90, 70, 26, 64, 78, 68, 34, 82, 0} a(42)={0, 84, 40, 80, 98, 94, 68, 20, 56, 70, 62, 32, 86, 12, 22, 10, 82, 26, 54, 60, 44, 6, 52, 76, 78, 58, 16, 58, 78, 76, 52, 6, 44, 60, 54, 26, 82, 10, 22, 12, 86, 32, 62, 70, 56, 20, 68, 94, 98, 80, 40, 84, 0} a(43)={0, 86, 46, 92, 12, 18, 4, 76, 22, 54, 66, 58, 30, 88, 20, 38, 36, 14, 78, 16, 40, 44, 28, 98, 42, 72, 82, 72, 42, 98, 28, 44, 40, 16, 78, 14, 36, 38, 20, 88, 30, 58, 66, 54, 22, 76, 4, 18, 12, 92, 46, 86, 0} a(44)={0, 88, 52, 104, 32, 48, 46, 26, 94, 38, 70, 84, 80, 58, 18, 66, 96, 2, 102, 78, 36, 82, 4, 14, 6, 86, 42, 86, 6, 14, 4, 82, 36, 78, 102, 2, 96, 66, 18, 58, 80, 84, 70, 38, 94, 26, 46, 48, 32, 104, 52, 88, 0} a(45)={0, 90, 58, 10, 52, 78, 88, 82, 60, 22, 74, 4, 24, 28, 16, 94, 50, 96, 20, 34, 32, 14, 86, 36, 76, 100, 2, 100, 76, 36, 86, 14, 32, 34, 20, 96, 50, 94, 16, 28, 24, 4, 74, 22, 60, 82, 88, 78, 52, 10, 58, 90, 0} a(46)={0, 92, 64, 22, 72, 2, 24, 32, 26, 6, 78, 30, 74, 104, 14, 16, 4, 84, 44, 96, 28, 52, 62, 58, 40, 8, 68, 8, 40, 58, 62, 52, 28, 96, 44, 84, 4, 16, 14, 104, 74, 30, 78, 6, 26, 32, 24, 2, 72, 22, 64, 92, 0} a(47)={0, 94, 70, 34, 92, 32, 66, 88, 98, 96, 82, 56, 18, 74, 12, 44, 64, 72, 68, 52, 24, 90, 38, 80, 4, 22, 28, 22, 4, 80, 38, 90, 24, 52, 68, 72, 64, 44, 12, 74, 18, 56, 82, 96, 98, 88, 66, 32, 92, 34, 70, 94, 0} a(48)={0, 96, 76, 46, 6, 62, 2, 38, 64, 80, 86, 82, 68, 44, 10, 72, 18, 60, 92, 8, 20, 22, 14, 102, 74, 36, 94, 36, 74, 102, 14, 22, 20, 8, 92, 60, 18, 72, 10, 44, 68, 82, 86, 80, 64, 38, 2, 62, 6, 46, 76, 96, 0} a(49)={0, 98, 82, 58, 26, 92, 44, 94, 30, 64, 90, 2, 12, 14, 8, 100, 78, 48, 10, 70, 16, 60, 96, 18, 38, 50, 54, 50, 38, 18, 96, 60, 16, 70, 10, 48, 78, 100, 8, 14, 12, 2, 90, 64, 30, 94, 44, 92, 26, 58, 82, 98, 0} a(50)={0, 100, 88, 70, 46, 16, 86, 44, 102, 48, 94, 28, 62, 90, 6, 22, 32, 36, 34, 26, 12, 98, 72, 40, 2, 64, 14, 64, 2, 40, 72, 98, 12, 26, 34, 36, 32, 22, 6, 90, 62, 28, 94, 48, 102, 44, 86, 16, 46, 70, 88, 100, 0} a(51)={0, 102, 94, 82, 66, 46, 22, 100, 68, 32, 98, 54, 6, 60, 4, 50, 92, 24, 58, 88, 8, 30, 48, 62, 72, 78, 80, 78, 72, 62, 48, 30, 8, 88, 58, 24, 92, 50, 4, 60, 6, 54, 98, 32, 68, 100, 22, 46, 66, 82, 94, 102, 0} a(52)={0, 104, 100, 94, 86, 76, 64, 50, 34, 16, 102, 80, 56, 30, 2, 78, 46, 12, 82, 44, 4, 68, 24, 84, 36, 92, 40, 92, 36, 84, 24, 68, 4, 44, 82, 12, 46, 78, 2, 30, 56, 80, 102, 16, 34, 50, 64, 76, 86, 94, 100, 104, 0}

Herein, it should be noted that a number in the foregoing sequence sets is equal to a number obtained after a modulo-2N operation is performed on rn(n+1) in the generation formula 1, and represents a complex number point on a unit circle. For example, 104 in a(52), which is the second element in a(52) and is corresponding to n=1 (the first element is corresponding to n=0), represents a complex number $$e^{\frac{i2\pi}{2*53}*52*1*(1+1)} = e^{\frac{i2\pi}{2*53}*104}.$$

In this embodiment, each numeric value in the set may also be represented in a complete complex number expression manner according to an actual requirement, which is not particularly limited in the present invention.

Afterward, a cyclic shift may be performed on the sequences in the basic sequence set to generate a complete long training sequence set C'. For example, as described above, if the sequence length is 53, a cyclic shift of 1 to 52 positions may be performed on a(1) to generate sequences a(1, 0), ..., a(1, t), ..., a(1, 52), where t indicates a quantity of positions of the cyclic shift.

That is, C'={â$^{(1,0)}$, ... â$^{(1,52)}$, ..., â$^{(r,0)}$, ..., â$^{(r,52)}$, ..., â$^{(52,0)}$, ..., â$^{(52,52)}$}, r={1, 2, ..., 52}, where a(1, 0)={0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0} a(1, 1)={2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0} a(1, 2)={6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2} a(1, 3)={12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6} a(1, 4)={20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12} a(1, 5)={30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20} a(1, 6)={42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30} a(1, 7)={56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42} a(1, 8)={72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56} a(1, 9)={90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72} a(1, 10)={4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90} a(1, 11)={26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4} a(1, 12)={50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26} a(1, 13)={76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50} a(1, 14)={104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76} a(1, 15)={28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104} a(1, 16)={60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28} a(1, 17)={94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60} a(1, 18)={24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94} a(1, 19)={62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24} a(1, 20)={102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62} a(1, 21)={38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102} a(1, 22)={82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38} a(1, 23)={22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82} a(1, 24)={70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22} a(1, 25)={14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70} a(1, 26)={66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14} a(1, 27)={14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66} a(1, 28)={70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14} a(1, 29)={22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70} a(1, 30)={82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22} a(1, 31)={38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82} a(1, 32)={102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38} a(1, 33)={62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102} a(1, 34)={24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62} a(1, 35)={94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24} a(1, 36)={60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94} a(1, 37)={28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60} a(1, 38)={104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28} a(1, 39)={76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104} a(1, 40)={50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76} a(1, 41)={26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50} a(1, 42)={4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26} a(1, 43)={90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4} a(1, 44)={72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90} a(1, 45)={56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72} a(1, 46)={42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56} a(1, 47)={30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42} a(1, 48)={20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30} a(1, 49)={12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20} a(1, 50)={6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12} a(1, 51)={2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6} a(1, 52)={0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2}

The same method may be used to perform a cyclic shift on a(2) to a(52), and herein, to avoid repetition, description thereof is omitted.

As described above, the long training sequence set C' in this embodiment is generated. That is, according to the method for generating a long training sequence in this embodiment, for example, in a case in which the quantity of available subcarriers in the system is 53, if a Zadoff-Chu sequence with a length of 53 is selected, 52×53=2756 long training sequences may be generated. Therefore, 2756 devices can be distinguished by using the long training sequences generated according to this embodiment, and this quantity is far greater than a quantity of devices that can be distinguished by using partial association identifier, which may meet a development requirement as a quantity of users increases quickly.

It should be understood that the foregoing listed method for determining each parameter in the method for generating a long training sequence is only for exemplary description. A person skilled in the art may randomly modify or select a used parameter according to the communications system to which this embodiment is applicable, for example, may randomly set the length of the long training sequence. For another example, after the foregoing basic long training sequence set C is obtained, no cyclic shift is performed, but instead, the basic long training sequence set C may be directly used as a long training sequence set C', or cyclic shifts may be performed in a length range of the long training sequence for any times (in other words, any quantity of positions), which is not particularly limited in the present invention. In addition, in this embodiment, for example, a pseudo-random sequence may also be used as a basic sequence for generating multiple LTSs used by the communications system, to generate the multiple different LTSs.

In addition, in this embodiment, the device C may further number each long training sequence in the long training sequence set C' determined in the foregoing step S210, for example, may set numbers of basic long training sequences to i=1, . . . , 52. Therefore, a shift of each long training sequence relative to the basic long training sequence is j=0, 1, . . . , 52. Therefore, the number of each long training sequence in the long training sequence set C' may be set to LTS ID=(i−1)×53+j.

In the basic long training sequence set C, numbers of sequences are set to i=1, . . . , 52.

In the long training sequence set C', a shift of each long training sequence relative to the basic long training sequence is j=0, 1, . . . , 52. Therefore, numbers of sequences may be set to LTS ID=(i−1)×53+j.

It should be understood that the foregoing listed numbering method is only for exemplary description, and the present invention is not limited thereto. Other numbering methods that can be used to uniquely distinguish a long training sequence from the long training sequence set C' all fall within the protection scope of the present invention.

In S220, the device C may determine a mapping relationship between the foregoing acquired long training sequence set C' and each terminal device in the system.

In this embodiment, the foregoing mapping relationship may be generated by each device itself (including the receiving device and the transmitting device) in the system according to a preset rule, or may be generated, according to a preset rule, by an external device independent of the receiving device and the transmitting device and delivered to each device (including the receiving device and the transmitting device) in the system. For ease of understanding and description, the following uses the device C as an execution entity to describe a method and process for determining a mapping relationship between the long training sequence set C' and each terminal device (specifically, a part or all of identity information of the terminal device, which is described later in detail) in the system.

First, the device C may select identity information of a device, where the identity information of the device is used to generate the foregoing mapping relationship.

Optionally, the identity information is any one piece of the following information: a Media Access Control MAC address, an Internet Protocol IP address, a basic service set identifier BSSID, association identity information AID, a mobile phone number, an international mobile subscriber identity IMSI, and an international mobile equipment identity IMEI.

Specifically, in this embodiment, the identity information of the device refers to information that can uniquely identify the device in a communications system in this embodiment. It should be noted that in this embodiment, the identity information may be information carried by the device at delivery, or may be allocated by the system to the device, which is not particularly limited in the present invention.

In this embodiment, the identity information may include information such as a Media Access Control (MAC) address, an Internet Protocol (IP) address, a basic service set identifier (BSSID), association identity information (AID), a mobile phone number, an international mobile subscriber identity (IMSI), and an international mobile equipment identity (IMEI). It should be understood that a subscriber identity in this embodiment of the present invention is not limited to the foregoing information. Other information elements that can uniquely indicate the subscriber identity all fall within the scope of this embodiment of the present invention.

For example, the device C may acquire a quantity of terminal devices accessing the system and identity information (for example, BSSIDs or AIDs) of the terminal devices, and therefore, may generate a mapping relationship between the identity information of the terminal devices and long training sequences according to the quantity of terminal devices and the quantity of generated long training sequences.

For example, if the quantity of generated long training sequences is greater than the quantity of terminal devices accessing the system, long training sequences of a quantity same as the quantity of terminal devices may be selected, and the long training sequences are in one-to-one correspondence with identity information of the terminal devices.

If the quantity of generated long training sequences is equal to the quantity of terminal devices accessing the system, the long training sequences may be in one-to-one correspondence with identity information of the terminal devices.

If the quantity of generated long training sequences is less than the quantity of terminal devices accessing the system, a part or all of the long training sequences may correspond to a part of identity information of the terminal devices (an example of first sub-identity information). In addition, a part or all of a remaining part of the identity information (an example of second sub-identity information) is carried in another field at the physical layer, which is described later in detail.

In the foregoing process, each device in the system needs to communicate with a management device or the like in the system in real time or periodically, to determine identity information of the terminal devices accessing the system and adjust the foregoing mapping relationship, which increases device burden and occupies communication resources.

Therefore, in this embodiment, identity information that can uniquely identify terminal devices in the communications system may be selected and used. Therefore, all terminal devices that can be identified by the identity information may be considered as devices accessing and using the communications system in this embodiment.

For ease of understanding, the following uses a MAC address as identity information for description.

First, a structure of the MAC address is described. FIG. 2 shows the structure of the MAC address. As shown in FIG. 2, the MAC address includes 48 bits, where an organization unique identifier (OUI) occupies bits b24 to b47 of the MAC address, is allocated by the Institute of Electrical and Electronics Engineers (IEEE), and may be understood as an identifier of a device manufacturer; and a product serial number (PSN) occupies bits b0 to b23 of the MAC address, and is allocated by a device manufacturer.

Because the MAC address includes 48 bits, theoretically, the MAC address can identify $2^{48}$ devices. This quantity is far greater than the quantity of generated long training sequences. Therefore, in this embodiment of the present invention, some bits (first sub-identity information) may be selected from the MAC address, and a mapping relationship between the first sub-identity information and each long training sequence may be generated. That is, in this embodiment of the present invention, one long training sequence may be mapped to multiple devices that have same first sub-identity information, and some or all remaining bits (an example of second sub-identity information) are carried in another field at a physical layer (this process is described later in detail).

In this embodiment, the device C may determine the first sub-identity information from the identity information according to the quantity of long training sequences generated in S210. As described above, in a case in which 52×53=2756 long training sequences are generated, the first sub-identity information may be determined in the following manners:

For example, 11 bits (for example, bits b0 to b10 in the MAC address, that is, first 11 bits in the PSN, which can identify $2^{11}$=2048 devices) may be selected from the MAC address, and used as the first sub-identity information.

For another example, 22 bits, for example, bits b0 to b21, may be selected from the MAC address, 11 bits are generated according to a preset operation rule, for example, the formula 2 below, and the 11 bits are used as the first sub-identity information (can identify $2^{11}$=2048 devices).

$$c(i)=b(2i)\oplus b(2i+1), i=0,1,\ldots,10 \quad\quad \text{Formula 2}$$

Alternatively, 24 bits, for example, bits b0 to b23, may be selected from the MAC address, 11 bits are generated according to a preset operation rule, for example, the formula 3 below, and the 11 bits are used as the first sub-identity information (can identify $2^{11}$=2048 devices).

$$c(i)=b(2i)\oplus b(2i+1), i=0,1,\ldots,8$$

$$c(9)=b(18)\oplus b(19)\oplus b(20)$$

$$c(10)=b(21)\oplus b(22)\oplus b(23) \quad\quad \text{Formula 3}$$

In the formula 2 and the formula 3, "$\oplus$" indicates exclusive OR processing.

Therefore, a mapping relationship between each long training sequence and each piece of first sub-identity information may be determined according to the preset rule. By using the preset rule, for example, the 11-bit binary first sub-identity information may be converted into a decimal number, and the number of converted first sub-identity information corresponds to a long training sequence having a same ID number as the foregoing determined long training sequence.

For another example, more than 11 bits (for example, bits b0 to b23 in the MAC address, that is, all of the PSN, which can identify $2^{24}$ devices) may be selected from the MAC address, and used as the first sub-identity information. In this case, the quantity of long training sequences is less than the quantity of devices that the first sub-identity information can identify. Therefore, the 24-bit binary first sub-identity information may be converted into a decimal number, and modulo operation processing is performed on a preset number (for example, the quantity of long training sequences) by using the number obtained after converting the first sub-identity information, and multiple pieces of first sub-identity information with a same modulus value correspond to one long training sequence.

It should be noted that the foregoing determined mapping relationship between each piece of first sub-identity information and each long training sequence may be recorded in an entry to form a list of mapping relationships, or may be expressed as a function relationship expression, which is not particularly limited in the present invention.

It should be understood that the foregoing listed method for selecting first sub-identity information is only for exemplary description, which is not particularly limited in the present invention. For example, the first sub-identity information may be determined from an OUI of a MAC address, or some consecutive or inconsecutive bytes may be selected from an IP address, a BSSID, an AID, a mobile phone number, an IMSI, or an IMEI, and used as the first sub-identity information. In addition, the foregoing listed method for determining a mapping relationship between each piece of first sub-identity information and each long training sequence is only for exemplary description, which is not particularly limited in the present invention. It should be noted that the methods for determining the foregoing first sub-identity information and the foregoing mapping relationship by all devices in the system need to be consistent, so as to ensure that a long training sequence (or the first sub-identity information) determined by a transmitting device and corresponding to a target receiving device is consistent with a long training sequence (or the first sub-identity information) determined by the target receiving device and corresponding to the target receiving device.

When a device A (an example of the transmitting device) needs to transmit data to a device B (an example of the target receiving device), the device A may determine a long training sequence set (consistent with the long training sequence set determined by the device C in S210), and a mapping relationship (consistent with the mapping relationship determined by the device C in S220) between each long training sequence in the long training sequence set and each receiving device in the system; in addition, the device A may determine first sub-identity information of the device B, for example, in a case in which a MAC address is used as identity information, may determine the first sub-identity information from a destination MAC address according to a preset rule (consistent with the rule used by the device C to determine first sub-identity information in S220), and determine, according to the foregoing mapping relationship and the first sub-identity information of the device B, (by searching a table or performing substitution in the function relationship expression), a long training sequence (hereinafter recorded as a long training sequence B) corresponding to the device B.

Afterward, the device A may perform encapsulation processing on the data to be sent, to generate a data packet. In this embodiment, because the used long training sequence is different from a long training sequence used in the prior art, herein, a process for generating a long training sequence symbol is mainly described in detail.

Specifically, when a quantity of subcarriers used in the system is greater than a quantity of elements in a long training sequence (or a sequence length), direct current carrier components may be set to 0. Afterward, subcarriers with "a quantity same as the quantity of elements in the long training sequence" are selected from non direct current carrier components, and the elements in the long training sequence are mapped to the selected subcarriers one by one. Finally, a specific numeric value or a cyclic shift element of the long training sequence is inserted in remaining subcarriers. For example, a numeric value "1" is inserted, used by the receiving device for channel estimation; or a numeric value "0" may be inserted, that is, no information is transmitted on the subcarriers.

When the quantity of subcarriers is equal to the quantity of elements in the long training sequence, one-to-one mapping may be performed on the elements in the long training sequence and the subcarriers, and afterward, the direct current carrier components may be set to 0.

When the quantity of subcarriers is less than the quantity of elements in the long training sequence, elements with "a quantity same as the quantity of subcarriers" may be selected from the elements in the long training sequence. Afterward, one-to-one mapping is performed on the selected elements and the subcarriers. Finally, the direct current carrier components are set to 0.

In this embodiment, the device A may add the long training sequence corresponding to the device B to a long training sequence field (field) at a physical layer of the data packet, and send the data packet to each receiving device.

In this embodiment, in a case in which the first sub-identity information is a part of the identity information, one long training sequence can identify multiple devices, and a receiving device cannot accurately determine, according to only the long training sequence, whether the receiving device is a target receiving device of the data packet. Therefore, in this embodiment, a transmitting device may further determine, according to a preset rule, second sub-identity information in identity information of a target receiving device other than the first sub-identity information.

For example, the device A may use a part of information (for example, bits b24 to b32 in a MAC address), except the first sub-identity information (for example, bits b0 to b10 in the MAC address), in the MAC address of the device B as the second sub-identity information (hereinafter recorded as second sub-identity information B).

In this embodiment, to enable the receiving device to obtain the second sub-identity information of the target receiving device by performing physical layer parsing, the device A may add the second sub-identity information (or a symbol indicating the second sub-identity information) to available space at the physical layer of the data packet. Therefore, the device A may further determine the second sub-identity information (specifically, a length of the second sub-identity information) according to the available space at the physical layer of the data packet. For example, in a case of a Wi-Fi system of the IEEE 802.11ac standard, a partial association identifier field (field) of 9 bits is added to a signal field (signal field) at the physical layer of the data packet. Therefore, in this embodiment, the device A may use information of 9 bits (for example, bits b24 to b32 in the MAC address) in the MAC address of the device B other than the first sub-identity information (for example, bits b0 to b10 in the MAC address) as the second sub-identity information B.

It should be understood that the foregoing listed method for determining second sub-identity information is only for exemplary description, and the present invention is not limited thereto. For example, the second sub-identity information may be consecutive or inconsecutive bits in the identity information. For another example, the second sub-identity information may be all information, except the first sub-identity information, in the identity information.

It should be noted that in this embodiment, the methods for determining second sub-identity information by all devices in the system need to be consistent, so as to ensure that the second sub-identity information of the target receiving device determined by the transmitting device is consistent with the second sub-identity information determined by the target receiving device.

According to the data transmission method in this embodiment, by using a long training sequence symbol (or first sub-identity information) and a second sub-identity information symbol (or second sub-identity information) to jointly indicate a device in the system, more devices can be identified, which further improves an effect of the present invention.

After determining the second sub-identity information, the device A may generate a second sub-identity information symbol used to indicate the second sub-identity information of the device B, and add the second sub-identity information symbol to the physical layer of the data packet, so that the receiving device can obtain the second sub-identity information of the target receiving device by performing physical layer parsing.

In a Wi-Fi system of the IEEE 802.11ac standard, a partial association identifier field (field) of 9 bits is added to a signal field at a physical layer of a data packet, and the foregoing generated second sub-identity information symbol may be carried in the partial association identifier field. Alternatively, the second sub-identity information may be used as a partial association identifier.

It should be understood that the foregoing listed method for carrying second sub-identity information (or a second sub-identity information symbol) is only for exemplary description, and the present invention is not limited thereto. Other methods that can enable the receiving device to acquire the second sub-identity information from the physical layer (or other layers before the physical layer in a parsing order) all fall within the protection scope of the present invention.

In addition, in this embodiment, in a transmission order, the second sub-identity information symbol may be located before the long training sequence symbol, or may be located behind the long training sequence symbol, which is not particularly limited in the present invention.

In addition, other processes for generating a data packet may be similar to those in the prior art, and herein, to avoid repetition, description thereof is omitted.

The table 1 to table 3 above show embodiments of a part (second sub-identity information) of identity information of the target receiving device carried in a partial association identifier field of a data packet and a part (first sub-identity information) of the identity information that is of the target receiving device and is corresponding to the long training sequence field.

As described above, by using the partial association identifier field and the long training sequence field to jointly identify user equipment in the system, multiple devices can be identified. For example, in a case in which a system bandwidth is 20 MHz, if a quantity of available subcarriers in the system is 53, and therefore, more than $2^{11}$ long training sequences may be generated and can correspond to $2^{11}$ devices. In addition, the partial association identifier field includes 9 bits, which can correspond to $2^9$ devices. Therefore, by combining the partial association identifier field and the long training sequence field (20 bits in total), $2^{11} \times 2^9 = 2^{20}$ devices can be identified.

Afterward, the device A, for example, may send the data packet to each device (including the device B) in the system in a broadcast manner over an air interface. In this embodiment, the method and process for sending a data packet may be the same as those in the prior art, and herein, to avoid repetition, description thereof is omitted.

In S230, the device C receives the data packet sent by the device A. In addition, in S240, the device C may acquire, from the physical layer of the data packet, the long training sequence B determined by the device A according to the target receiving device (that is, the device B).

Therefore, in S250, the device C may process the data packet according to the long training sequence B. As the processing performed according to the long training sequence B, the following processes may be listed:

When the first sub-identity information is all of the identity information, the long training sequence B corresponds to only one receiving device (that is, case 3); when the first sub-identity information is a part of the identity information, the long training sequence B may correspond to multiple receiving devices (that is, case 4). The following describes the processing process in the foregoing two cases separately.

Case 3

Optionally, the processing the data packet according to the target long training sequence and the mapping relationship includes: determining, according to first sub-identity information of the first receiving device and the mapping relationship, a first long training sequence corresponding to the first receiving device; and processing the data packet according to a relationship between the target long training sequence and the first long training sequence.

Specifically, after determining the mapping relationship between the long training sequence set C' and each terminal device in the system, the device C may determine a long training sequence (an example of the first long training sequence, hereinafter recorded as a long training sequence C) corresponding to the device C.

Therefore, whether the long training sequence C is consistent with the long training sequence B may be determined.

Herein, it should be noted that in a case in which a polyphase perfect sequence (for example, a Zadoff-Chu sequence) is used as a long training sequence, ideal autocorrelation properties and optimum cross-correlation properties of the polyphase perfect sequence may be used to quickly and conveniently distinguish whether the long training sequence C is consistent with the long training sequence B.

Specifically, the device C may perform correlation calculation on the long training sequence C and the long training sequence B according to the foregoing formula 4.

FIG. 3 is a line graph of an autocorrelation function and a cross-correlation function of a Zadoff-Chu sequence. As shown in FIG. 3, if the long training sequence C is consistent with the long training sequence B, a peak value may occur. Therefore, the device C may determine, according to whether the peak value occurs or whether a correlation value $R_{r,s}(\tau)$ exceeds a threshold, whether the long training sequence C is consistent with the long training sequence B.

It should be understood that the foregoing listed method for determining whether the long training sequence C is consistent with the long training sequence B is only for exemplary description, and the present invention is not limited thereto. For example, the long training sequence C may be compared with the long training sequence B bit by bit to determine whether the long training sequence C is consistent with the long training sequence B.

The processing the data packet according to a relationship between the target long training sequence and the first long training sequence includes: discarding the data packet if the target long training sequence is different from the first long training sequence.

Specifically, if the long training sequence C is inconsistent with the long training sequence B, the device C may determine that the device C is not the target receiving device of the data packet, and therefore may, for example, discard the data packet.

Optionally, when the first sub-identity information is all of the identity information, the processing the data packet according to a relationship between the target long training sequence and the first long training sequence includes: if the target long training sequence is the same as the first long training sequence, acquiring, from the data packet, data that needs to be transmitted by the transmitting device.

Specifically, if the long training sequence C is consistent with the long training sequence B, the device C may determine that the device C is the target receiving device of the data packet, and therefore may, for example, parse the data packet to acquire the data that needs to be sent by the device A.

Optionally, the processing the data packet according to the target long training sequence and the mapping relationship includes: determining the first sub-identity information of the target receiving device of the data packet according to the target long training sequence and the mapping relationship; and processing the data packet according to a relationship between first sub-identity information of the first receiving device and the first sub-identity information of the target receiving device.

Specifically, when receiving the data packet sent by the device A, the device C may acquire, from the physical layer of the data packet, the long training sequence B determined by the device A according to the target receiving device (that is, the device B), and find, according to the foregoing determined mapping relationship, first sub-identity information of a device (herein, the device B) corresponding to the long training sequence B.

Optionally, the processing the data packet according to a relationship between first sub-identity information of the first receiving device and the first sub-identity information of the target receiving device includes: discarding the data packet if the first sub-identity information of the first receiving device is different from the first sub-identity information of the target receiving device.

Specifically, if the first sub-identity information of the device B is inconsistent with first sub-identity information of the device C, the device C may determine that the device C is not the target receiving device of the data packet, and therefore may, for example, discard the data packet.

Optionally, when the first sub-identity information is all of the identity information, the processing the data packet according to a relationship between first sub-identity information of the first receiving device and the first sub-identity information of the target receiving device includes: if the first sub-identity information of the first receiving device is the same as the first sub-identity information of the target receiving device, acquiring, from the data packet, data that needs to be transmitted by the transmitting device.

Specifically, if the first sub-identity information of the device B is consistent with first sub-identity information of the device C, the device C may determine that the device C is the target receiving device of the data packet, and therefore may, for example, parse the data packet to acquire the data that needs to be sent by the device A.

Case 4

Optionally, when the first sub-identity information is a part of the identity information, the processing the data packet according to a relationship between first sub-identity information of the first receiving device and the first sub-identity information of the target receiving device includes: if the first sub-identity information of the first receiving device is the same as the first sub-identity information of the target receiving device, acquiring a second sub-identity information symbol carried at the physical layer of the data packet, where the second sub-identity information symbol is used to indicate second sub-identity information of the target receiving device; and processing the data packet according to a relationship between the second sub-identity information of the target receiving device and second sub-identity information of the first receiving device, where the second sub-identity information belongs to a part, except the first sub-identity information, in the identity information.

Specifically, when receiving the data packet sent by the device A, the device C may acquire, from the physical layer of the data packet, the long training sequence B determined by the device A according to the target receiving device (that is, the device B), and find, according to the foregoing determined mapping relationship, first sub-identity information of a device (herein, the device B) corresponding to the long training sequence B.

If the first sub-identity information of the device B is inconsistent with first sub-identity information of the device C, the device C may determine that the device C is not the target receiving device of the data packet, and therefore may, for example, discard the data packet.

Because the first sub-identity information is only a part of the identity information, that is, one piece of first sub-identity information may be corresponding to multiple devices, if the first sub-identity information of the device B is consistent with the first sub-identity information of the device C, the device C may determine that the device C may be the target receiving device of the data packet, and therefore may continue to parse the data packet to acquire the second sub-identity information (that is, the second sub-identity information B) of the target receiving device from the physical layer of the data packet.

The device C may determine second sub-identity information (hereinafter recorded as second sub-identity information C) of the device C according to a preset rule (consistent with the preset rule used by the device A to determine second sub-identity information). In addition, the process is the same as the foregoing process for determining the second sub-identity information by the device A, and herein, to avoid repetition, description thereof is omitted.

Therefore, if the second sub-identity information B is inconsistent with the second sub-identity information C, the device C may determine that the device C is not the target receiving device of the data packet, and therefore may, for example, discard the data packet.

If the second sub-identity information B is consistent with the second sub-identity information C, the device C may determine that the device C is the target receiving device of the data packet, and therefore may, for example, parse the data packet to acquire the data that needs to be sent by the device A.

Optionally, when the first sub-identity information is a part of the identity information, the processing the data packet according to a relationship between the target long training sequence and the first long training sequence includes: if the target long training sequence is the same as the first long training sequence, acquiring a second sub-identity information symbol carried at the physical layer of the data packet, where the second sub-identity information symbol is used to indicate second sub-identity information of the target receiving device; and processing the data packet according to a relationship between the second sub-identity information of the target receiving device and second sub-identity information of the first receiving device, where the second sub-identity information belongs to a part, except the first sub-identity information, in the identity information.

Specifically, after determining the mapping relationship between the long training sequence set C' and each terminal device in the system, the device C may determine a long training sequence (hereinafter recorded as a long training sequence C) corresponding to the device C.

Therefore, whether the long training sequence C is consistent with the long training sequence B may be determined.

Herein, it should be noted that in a case in which a polyphase perfect sequence (for example, a Zadoff-Chu sequence) is used as a long training sequence, ideal autocorrelation properties and optimum cross-correlation properties of the polyphase perfect sequence may be used to quickly and conveniently distinguish whether the long training sequence C is consistent with the long training sequence B.

Specifically, the device C may perform correlation calculation on the long training sequence C and the long training sequence B according to the foregoing formula 4. If the long training sequence C is consistent with the long training sequence B, a peak value may occur. Therefore, the device C may determine, according to whether the peak value occurs or whether a correlation value $R_{r,s}(\tau)$ exceeds a threshold, whether the long training sequence C is consistent with the long training sequence B.

It should be understood that the foregoing listed method for determining whether the long training sequence C is consistent with the long training sequence B is only for exemplary description, and the present invention is not limited thereto. For example, the long training sequence C may be compared with the long training sequence B bit by bit to determine whether the long training sequence C is consistent with the long training sequence B.

Therefore, if the long training sequence C is inconsistent with the long training sequence B, the device C may determine that the device C is not the target receiving device of the data packet, and therefore may, for example, discard the data packet.

Because the first sub-identity information is only a part of the identity information, that is, one piece of first sub-identity information may be corresponding to multiple devices, if the long training sequence C is consistent with the long training sequence B, the device C may determine that the device C may be the target receiving device of the data packet, and therefore may continue to parse the data packet to acquire the second sub-identity information (that is, the second sub-identity information B) of the target receiving device from the physical layer of the data packet.

In addition, the device C may determine second sub-identity information (hereinafter recorded as second sub-identity information C) of the device C according to a preset rule (consistent with the preset rule used by the device A to determine second sub-identity information). In addition, the process is the same as the foregoing process for determining the second sub-identity information by the device A, and herein, to avoid repetition, description thereof is omitted.

Therefore, if the second sub-identity information B is inconsistent with the second sub-identity information C, the device C may determine that the device C is not the target receiving device of the data packet, and therefore may, for example, discard the data packet.

If the second sub-identity information B is consistent with the second sub-identity information C, the device C may determine that the device C is the target receiving device of the data packet, and therefore may, for example, parse the data packet to acquire the data that needs to be sent by the device A.

In this embodiment, the data packet received by the device C may be a data packet that is sent to only the device C by the device A, or may be a data packet broadcast by the device A. Therefore, in this embodiment, the processing the data packet according to the target long training sequence further includes: determining, from the long training sequence set, a third long training sequence corresponding to first sub-identity information of all receiving devices in the communications system; and if the target long training sequence is the same as the third long training sequence, acquiring, from the data packet, data that needs to be transmitted by the transmitting device.

Specifically, if the device A needs to send a data packet to each receiving device in the system, or in a case in which each receiving device in the system is the target receiving device of the data packet, the device A may select a long training sequence (a third long training sequence) from the determined long training sequence set according to a preset rule, for example, a long training sequence that is indicated by a long training sequence symbol whose bits are all 0s or 1s and that is corresponding to the device A, or the first or the last long training sequence in the long training sequence set, and use the long training sequence as the target long training sequence, to identify that the target receiving device of the data packet is all the receiving devices in the system.

Each receiving device in the system may determine the third long training sequence according to the preset rule (same as the rule used by the device A). In a case in which the target long training sequence carried in the data packet is the third long training sequence, it indicates that the data is broadcast data and therefore may be received.

It should be noted that in this embodiment, the process for determining whether a data packet is broadcast data may occur before or after the process for determining whether a receiving device is a target receiving device of the data packet (that is, the processing process in S250), which is not particularly limited in the present invention.

In addition, it should be noted that in a case in which, for example, the device A needs to send a data packet to each receiving device in the system, or each receiving device in the system is the target receiving device of the data packet, the device A may configure, by means of negotiation, a special long training sequence symbol to identify that the target receiving device of the data packet is all the receiving devices in the system.

According to the data transmission method in this embodiment, when a transmitting device needs to transmit data to a target receiving device, the transmitting device selects, from a long training sequence set, a target long training sequence corresponding to the target receiving device, and adds the target long training sequence to a long training sequence field at a physical layer of a generated data packet, so that a receiving device can determine the target receiving device of the data packet according to the target long training sequence. Therefore, in a case in which the receiving device is not the target receiving device of the data packet, the receiving device does not need to continue to parse the data packet, which can reduce burden of the receiving device, reduce waste of hardware resources, and improve user experience.

The data transmission methods of the embodiments have been described in detail above with reference to FIG. 1 to FIG. 4. The following describes in detail data transmission apparatuses of embodiments with reference to FIG. 5 and FIG. 6.

Figure 5:
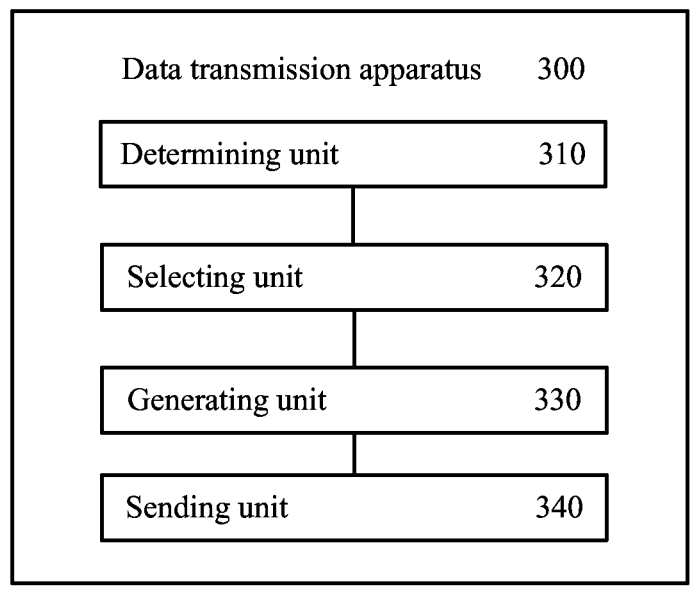
FIG. 5 is a schematic block diagram of a data transmission apparatus according to an embodiment.

FIG. 5 shows a data transmission apparatus 300 according to an embodiment. As shown in FIG. 5, the apparatus 300 includes a determining unit 310, configured to determine a long training sequence set, where the long training sequence set includes at least two long training sequences, and determine a mapping relationship between each long training sequence in the long training sequence set and first sub-identity information in identity information of each receiving device in a communications system, where one piece of identity information is used to uniquely indicate one receiving device in the communications system, and the first sub-identity information is a part or all of the identity information. The apparatus also includes a selecting unit 320, configured to: when data needs to be transmitted to a target receiving device, select a target long training sequence from the long training sequence set according to first sub-identity information of the target receiving device and the mapping relationship. The apparatus also includes a generating unit 330, configured to perform encapsulation processing on the data according to the target long training sequence to generate a data packet, so as to carry, in a long training sequence field at a physical layer of the data packet, a long training sequence symbol used to indicate the target long training sequence. The apparatus also includes a sending unit 340, configured to send the data packet to the target receiving device, so that the target receiving device processes the data packet according to the target long training sequence after acquiring the target long training sequence from the data packet.

Optionally, when the target receiving device is one receiving device in the communications system, the selecting unit 320 is specifically configured to select, from the long training sequence set according to the first sub-identity information of the target receiving device and the mapping relationship, a second long training sequence corresponding to only the first sub-identity information of the target receiving device as the target long training sequence.

Optionally, when the first sub-identity information is a part of the identity information, the generating unit 330 is specifically configured to perform encapsulation processing on the data to generate the data packet, where a second sub-identity information symbol is carried at the physical layer of the data packet, where the second sub-identity information symbol is used to indicate second sub-identity information of the target receiving device, and the second sub-identity information belongs to a part, except the first sub-identity information, in the identity information.

Optionally, the second sub-identity information symbol is carried in a partial association identifier field at the physical layer of the data packet.

Optionally, when the target receiving device is all receiving devices in the communications system, the selecting unit 320 is specifically configured to select, from the long training sequence set according to the first sub-identity information of the target receiving device and the mapping relationship, a third long training sequence corresponding to first sub-identity information of all the receiving devices in the communications system as the target long training sequence.

Optionally, the long training sequence is a sequence with good correlation properties.

Optionally, the sequence with good correlation properties is any one of the following sequences: a polyphase perfect sequence, a Gold sequence, a Gold-like sequence, and a pseudo-random sequence, for example, an m sequence.

Optionally, the polyphase perfect sequence is any one of the following sequences: a Zadoff-Chu sequence, a Frank sequence, and a Combined Frank/Zadoff-Chu sequence.

Optionally, a length of the long training sequence is determined according to a quantity of available subcarriers in the communications system.

Optionally, the identity information is any one piece of the following information: a Media Access Control MAC address, an Internet Protocol IP address, a basic service set identifier BSSID, association identity information AID, a mobile phone number, an international mobile subscriber identity IMSI, and an international mobile equipment identity IMEI.

The data transmission apparatus 300 according to this embodiment may be corresponding to the transmitting device (the device A) in the method embodiment, and furthermore, units, that is, modules, in the data transmission apparatus 300 and the foregoing other operations and/or functions are respectively intended to implement the corresponding procedures of the method 100 in FIG. 1. For brevity, details are not described herein again.

According to the data transmission apparatus in this embodiment, when a transmitting device needs to transmit data to a target receiving device, the transmitting device selects, from a long training sequence set, a target long training sequence corresponding to the target receiving device, and adds the target long training sequence to a long training sequence field at a physical layer of a generated data packet, so that a receiving device can determine the target receiving device of the data packet according to the target long training sequence. Therefore, in a case in which the receiving device is not the target receiving device of the data packet, the receiving device does not need to continue to parse the data packet, which can reduce burden of the receiving device, reduce waste of hardware resources, and improve user experience.

Figure 6:
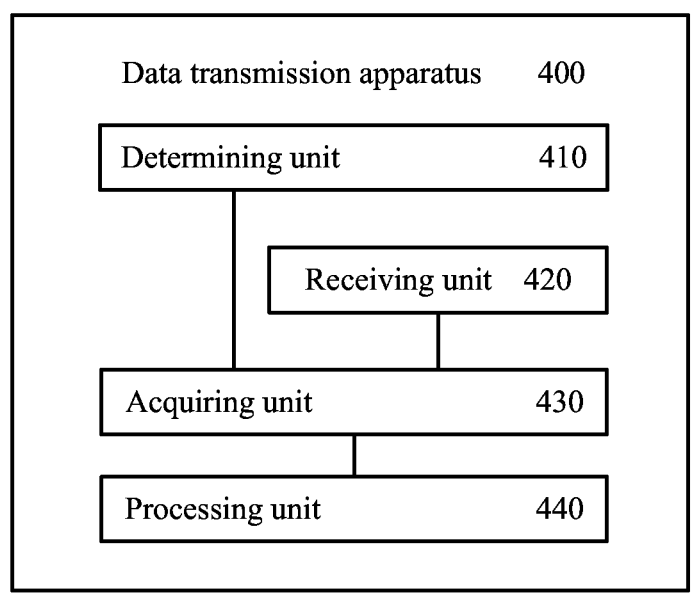
FIG. 6 is a schematic block diagram of a data transmission apparatus according to another embodiment.

FIG. 6 shows a data transmission apparatus 400 according to an embodiment. As shown in FIG. 6, the apparatus 400 includes a determining unit 410, configured to determine a long training sequence set, where the long training sequence set includes at least two long training sequences, and determine a mapping relationship between each long training sequence in the long training sequence set and first sub-identity information in identity information of each receiving device in a communications system, where one piece of identity information is used to uniquely indicate one receiving device in the communications system, and the first sub-identity information is a part or all of the identity information. The apparatus also includes a receiving unit 420, configured to receive a data packet transmitted by a transmitting device. The apparatus also includes an acquiring unit 430, configured to acquire a long training sequence symbol carried in a long training sequence field at a physical layer of the data packet, where the long training sequence symbol is used to indicate a target long training sequence, and the target long training sequence is determined by the transmitting device from the long training sequence set according to the mapping relationship. The apparatus also includes a processing unit 440, configured to determine the target long training sequence according to the long training sequence symbol, and process the data packet according to the target long training sequence and the mapping relationship.

Optionally, the processing unit 440 is specifically configured to determine first sub-identity information of a target receiving device of the data packet according to the target long training sequence and the mapping relationship; and process the data packet according to a relationship between first sub-identity information of the apparatus and the first sub-identity information of the target receiving device.

Optionally, the processing unit 440 is specifically configured to discard the data packet if the first sub-identity information of the apparatus is different from the first sub-identity information of the target receiving device.

Optionally, the processing unit 440 is specifically configured to: if the first sub-identity information of the apparatus is the same as the first sub-identity information of the target receiving device, acquire, from the data packet, data that needs to be transmitted by the transmitting device.

Optionally, when the first sub-identity information is a part of the identity information, the processing unit 440 is specifically configured to: if the first sub-identity information of the apparatus is the same as the first sub-identity information of the target receiving device, instruct the acquiring unit 430 to acquire a second sub-identity information symbol carried at the physical layer of the data packet, where the second sub-identity information symbol is used to indicate second sub-identity information of the target receiving device; and process the data packet according to a relationship between the second sub-identity information of the target receiving device and second sub-identity information of the apparatus, where the second sub-identity information belongs to a part, except the first sub-identity information, in the identity information.

Optionally, the processing unit 440 is specifically configured to determine, according to first sub-identity information of the apparatus and the mapping relationship, a first long training sequence corresponding to the apparatus; and process the data packet according to a relationship between the target long training sequence and the first long training sequence.

Optionally, the processing unit 440 is specifically configured to discard the data packet if the target long training sequence is different from the first long training sequence.

Optionally, when the first sub-identity information is all of the identity information, the processing unit 440 is specifically configured to: if the target long training sequence is the same as the first long training sequence, acquire, from the data packet, data that needs to be transmitted by the transmitting device.

Optionally, when the first sub-identity information is a part of the identity information, the processing unit 440 is specifically configured to: if the target long training sequence is the same as the first long training sequence, instruct the acquiring unit 430 to acquire a second sub-identity information symbol carried at the physical layer of the data packet, where the second sub-identity information symbol is used to indicate second sub-identity information of the target receiving device; and process the data packet according to a relationship between the second sub-identity information of the target receiving device and second sub-identity information of the apparatus, where the second sub-identity information belongs to a part, except the first sub-identity information, in the identity information.

Optionally, the processing unit 440 is specifically configured to discard the data packet if the second sub-identity information of the target receiving device is different from the second sub-identity information of the apparatus; or if the second sub-identity information of the target receiving device is the same as the second sub-identity information of the apparatus, acquire, from the data packet, data that needs to be transmitted by the transmitting device.

Optionally, the second sub-identity information symbol is carried in a partial association identifier field at the physical layer of the data packet.

Optionally, the processing unit 440 is further configured to determine, from the long training sequence set, a third long training sequence corresponding to first sub-identity information of all receiving devices in the communications system; and discard the data packet if the target long training sequence is different from the third long training sequence; or if the target long training sequence is the same as the third long training sequence, acquire, from the data packet, data that needs to be transmitted by the transmitting device.

Optionally, the long training sequence is a sequence with good correlation properties.

Optionally, the sequence with good correlation properties is any one of the following sequences: a polyphase perfect sequence, a Gold sequence, a Gold-like sequence, and a pseudo-random sequence, for example, an m sequence.

Optionally, the polyphase perfect sequence is any one of the following sequences: a Zadoff-Chu sequence, a Frank sequence, and a Combined Frank/Zadoff-Chu sequence.

Optionally, a length of the long training sequence is determined according to a quantity of available subcarriers in the communications system.

Optionally, the identity information is any one piece of the following information: a Media Access Control MAC address, an Internet Protocol IP address, a basic service set identifier BSSID, association identity information AID, a mobile phone number, an international mobile subscriber identity IMSI, and an international mobile equipment identity IMEI.

The data transmission apparatus 400 according to this embodiment may be corresponding to the receiving device (the device C) in the method embodiment, and furthermore, units, that is, modules, in the data transmission apparatus 400 and the foregoing other operations and/or functions are respectively intended to implement the corresponding procedures of the method 200 in FIG. 4. For brevity, details are not described herein again.

According to the data transmission apparatus in this embodiment, when a transmitting device needs to transmit data to a target receiving device, the transmitting device selects, from a long training sequence set, a target long training sequence corresponding to the target receiving device, and adds the target long training sequence to a long training sequence field at a physical layer of a generated data packet, so that a receiving device can determine the target receiving device of the data packet according to the target long training sequence. Therefore, in a case in which the receiving device is not the target receiving device of the data packet, the receiving device does not need to continue to parse the data packet, which can reduce burden of the receiving device, reduce waste of hardware resources, and improve user experience.

The data transmission methods of the embodiments have been described in detail above with reference to FIG. 1 to FIG. 4. The following describes in detail data transmission devices of embodiments of the present invention with reference to FIG. 7 and FIG. 8.

Figure 7:
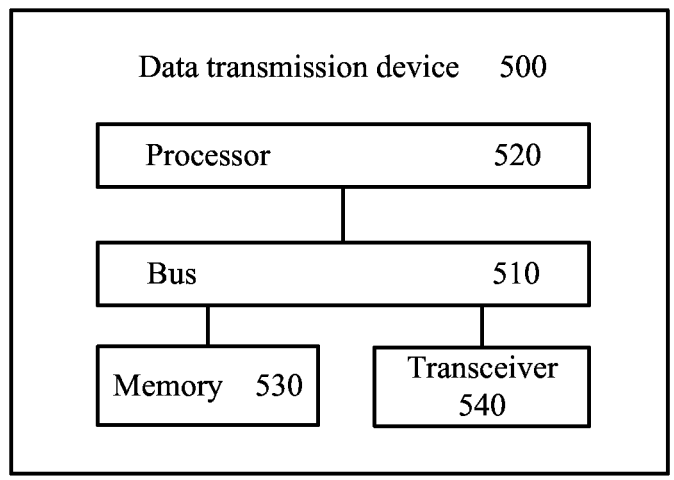
FIG. 7 is a schematic structural diagram of a data transmission device according to an embodiment.

FIG. 7 shows a data transmission device 500 according to an embodiment. As shown in FIG. 7, the device 500 includes: a bus 510; a processor 520 connected to the bus 510; a memory 530 connected to the bus 510; and a transceiver 540 connected to the bus 510.

The processor 520 invokes, by using the bus 510, a program stored in the memory 530, so as to determine a long training sequence set, where the long training sequence set includes at least two long training sequences; determine a mapping relationship between each long training sequence in the long training sequence set and first sub-identity information in identity information of each receiving device in a communications system, where one piece of identity information is used to uniquely indicate one receiving device in the communications system, and the first sub-identity information is a part or all of the identity information; when data needs to be transmitted to a target receiving device, select a target long training sequence from the long training sequence set according to first sub-identity information of the target receiving device and the mapping relationship; perform encapsulation processing on the data according to the target long training sequence to generate a data packet, so as to carry, in a long training sequence field at a physical layer of the data packet, a long training sequence symbol used to indicate the target long training sequence; and control the transceiver 540 to send the data packet to the target receiving device, so that the target receiving device processes the data packet according to the target long training sequence after acquiring the target long training sequence from the data packet.

Optionally, when the target receiving device is one receiving device in the communications system, the processor 520 is specifically configured to select, from the long training sequence set according to the first sub-identity information of the target receiving device and the mapping relationship, a second long training sequence corresponding to only the first sub-identity information of the target receiving device as the target long training sequence.

Optionally, when the first sub-identity information is a part of the identity information, the processor 520 is specifically configured to perform encapsulation processing on the data to generate the data packet, where a second sub-identity information symbol is carried at the physical layer of the data packet, where the second sub-identity information symbol is used to indicate second sub-identity information of the target receiving device, and the second sub-identity information belongs to a part, except the first sub-identity information, in the identity information.

Optionally, the second sub-identity information symbol is carried in a partial association identifier field at the physical layer of the data packet.

Optionally, when the target receiving device is all receiving devices in the communications system, the processor 520 is specifically configured to select, from the long training sequence set according to the first sub-identity information of the target receiving device and the mapping relationship, a third long training sequence corresponding to first sub-identity information of all the receiving devices in the communications system as the target long training sequence.

Optionally, the long training sequence is a sequence with good correlation properties.

Optionally, the sequence with good correlation properties is any one of the following sequences: a polyphase perfect sequence, a Gold sequence, a Gold-like sequence, and a pseudo-random sequence, for example, an m sequence.

Optionally, the polyphase perfect sequence is any one of the following sequences: a Zadoff-Chu sequence, a Frank sequence, and a Combined Frank/Zadoff-Chu sequence.

Optionally, a length of the long training sequence is determined according to a quantity of available subcarriers in the communications system.

Optionally, the identity information is any one piece of the following information: a Media Access Control MAC address, an Internet Protocol IP address, a basic service set identifier BSSID, association identity information AID, a mobile phone number, an international mobile subscriber identity IMSI, and an international mobile equipment identity IMEI.

In this embodiment, the processor may also be referred to as a CPU. The memory may include a read-only memory and a random access memory, and provide an instruction and data to the processor. A part of the memory may further include a non-volatile random access memory (NVRAM). In a specific application, the data transmission device may be embedded in or may be, for example, a standard Ethernet communications device such as a personal computer; modules of the data transmission device are coupled together by using a bus system, where the bus system includes a power bus, a control bus, and a status signal bus in addition to a data bus.

The processor may implement or execute steps and logical block diagrams disclosed in the method embodiments of the present invention. A general purpose processor may be a microprocessor or the processor may be any conventional processor, decoder, or the like. Steps of the methods disclosed with reference to the embodiments may be directly executed and completed by means of a hardware processor, or may be executed and completed by using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory, and a decoding unit or processing unit reads information in the memory and completes the steps in the foregoing methods in combination with hardware of the decoding unit or processing unit.

It should be understood that in the embodiments, the processor may be a central processing unit ("CPU" for short), or the processor may be another general purpose processor, a digital signal processor (DSP), an application-specific integrated circuit (ASIC), a field programmable gate array (FPGA), or another programmable logical device, discrete gate or transistor logical device, discrete hardware component, or the like. The general purpose processor may be a microprocessor or the processor may be any conventional processor or the like.

In an implementation process, the steps in the foregoing methods may be completed by an integrated logic circuit of hardware in the processor or an instruction in a form of software. Steps of the methods disclosed with reference to the embodiments may be directly executed and completed by means of a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor. To avoid repetition, details are not described herein again.

The data transmission device 500 according to this embodiment may be corresponding to the transmitting device (the device A) in the method embodiment, and furthermore, units, that is, modules, in the data transmission device 500 and the foregoing other operations and/or functions are respectively intended to implement the corresponding procedures of the method 100 in FIG. 1. For brevity, details are not described herein again.

According to the data transmission device in this embodiment, when a transmitting device needs to transmit data to a target receiving device, the transmitting device selects, from a long training sequence set, a target long training sequence corresponding to the target receiving device, and adds the target long training sequence to a long training sequence field at a physical layer of a generated data packet, so that a receiving device can determine the target receiving device of the data packet according to the target long training sequence. Therefore, in a case in which the receiving device is not the target receiving device of the data packet, the receiving device does not need to continue to parse the data packet, which can reduce burden of the receiving device, reduce waste of hardware resources, and improve user experience.

Figure 8:
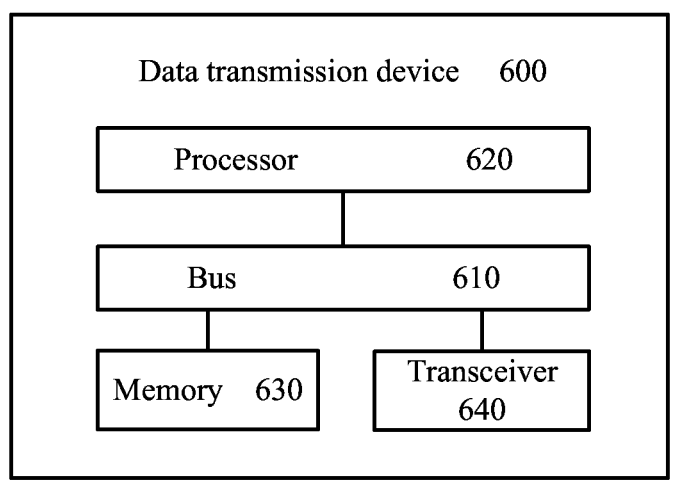
FIG. 8 is a schematic structural diagram of a data transmission device according to another embodiment.

FIG. 8 shows a data transmission device 600 according to an embodiment. As shown in FIG. 8, the device 600 includes: a bus 610; a processor 620 connected to the bus 610; a memory 630 connected to the bus 610; and a transceiver 640 connected to the bus 610.

The processor 620 invokes, by using the bus 610, a program stored in the memory 630, so as to determine a long training sequence set, where the long training sequence set includes at least two long training sequences; determine a mapping relationship between each long training sequence in the long training sequence set and first sub-identity information in identity information of each receiving device in a communications system, where one piece of identity information is used to uniquely indicate one receiving device in the communications system, and the first sub-identity information is a part or all of the identity information; control the transceiver 640 to receive a data packet transmitted by a transmitting device; acquire a long training sequence symbol carried in a long training sequence field at a physical layer of the data packet, where the long training sequence symbol is used to indicate a target long training sequence, and the target long training sequence is selected by the transmitting device from the long training sequence set according to first sub-identity information of a target receiving device of the data packet and the mapping relationship; determine the target long training sequence according to the long training sequence symbol; and process the data packet according to the target long training sequence and the mapping relationship.

Optionally, the processor 620 is specifically configured to determine the first sub-identity information of the target receiving device of the data packet according to the target long training sequence and the mapping relationship; and process the data packet according to a relationship between first sub-identity information of the device and the first sub-identity information of the target receiving device.

Optionally, the processor 620 is specifically configured to discard the data packet if the first sub-identity information of the device is different from the first sub-identity information of the target receiving device.

Optionally, the processor 620 is specifically configured to: if the first sub-identity information of the device is the same as the first sub-identity information of the target receiving device, acquire, from the data packet, data that needs to be transmitted by the transmitting device.

Optionally, when the first sub-identity information is a part of the identity information, the processor 620 is specifically configured to: if the first sub-identity information of the device is the same as the first sub-identity information of the target receiving device, instruct the transceiver 640 to acquire a second sub-identity information symbol carried at the physical layer of the data packet, where the second sub-identity information symbol is used to indicate second sub-identity information of the target receiving device; and process the data packet according to a relationship between the second sub-identity information of the target receiving device and second sub-identity information of the device, where the second sub-identity information belongs to a part, except the first sub-identity information, in the identity information.

Optionally, the processor 620 is specifically configured to determine, according to first sub-identity information of the device and the mapping relationship, a first long training sequence corresponding to the device; and process the data packet according to a relationship between the target long training sequence and the first long training sequence.

Optionally, the processor 620 is specifically configured to discard the data packet if the target long training sequence is different from the first long training sequence.

Optionally, when the first sub-identity information is all of the identity information, the processor 620 is specifically configured to: if the target long training sequence is the same as the first long training sequence, acquire, from the data packet, data that needs to be transmitted by the transmitting device.

Optionally, when the first sub-identity information is a part of the identity information, the processor 620 is specifically configured to: if the target long training sequence is the same as the first long training sequence, instruct the transceiver 640 to acquire a second sub-identity information symbol carried at the physical layer of the data packet, where the second sub-identity information symbol is used to indicate second sub-identity information of the target receiving device; and process the data packet according to a relationship between the second sub-identity information of the target receiving device and second sub-identity information of the device, where the second sub-identity information belongs to a part, except the first sub-identity information, in the identity information.

Optionally, the processor 620 is specifically configured to discard the data packet if the second sub-identity information of the target receiving device is different from the second sub-identity information of the device; or if the second sub-identity information of the target receiving device is the same as the second sub-identity information of the device, acquire, from the data packet, data that needs to be transmitted by the transmitting device.

Optionally, the second sub-identity information symbol is carried in a partial association identifier field at the physical layer of the data packet.

Optionally, the processor 620 is further configured to determine, from the long training sequence set, a third long training sequence corresponding to first sub-identity information of all receiving devices in the communications system; and if the target long training sequence is the same as the third long training sequence, acquire, from the data packet, data that needs to be transmitted by the transmitting device.

Optionally, the long training sequence is a sequence with good correlation properties.

Optionally, the sequence with good correlation properties is any one of the following sequences: a polyphase perfect sequence, a Gold sequence, a Gold-like sequence, and a pseudo-random sequence, for example, an m sequence.

Optionally, the polyphase perfect sequence is any one of the following sequences: a Zadoff-Chu sequence, a Frank sequence, and a Combined Frank/Zadoff-Chu sequence.

Optionally, a length of the long training sequence is determined according to a quantity of available subcarriers in the communications system.

Optionally, the identity information is any one piece of the following information: a Media Access Control MAC address, an Internet Protocol IP address, a basic service set identifier BSSID, association identity information AID, a mobile phone number, an international mobile subscriber identity IMSI, and an international mobile equipment identity IMEI.

In this embodiment, the processor may also be referred to as a CPU. The memory may include a read-only memory and a random access memory, and provide an instruction and data to the processor. A part of the memory may further include a non-volatile random access memory (NVRAM). In a specific application, the data transmission device may be embedded in or may be, for example, a standard Ethernet communications device such as a personal computer; modules of the data transmission device are coupled together by using a bus system, where the bus system includes a power bus, a control bus, and a status signal bus in addition to a data bus.

The processor may implement or execute steps and logical block diagrams disclosed in the method embodiments of the present invention. A general purpose processor may be a microprocessor or the processor may be any conventional processor, decoder, or the like. Steps of the methods disclosed with reference to the embodiments of the present invention may be directly executed and completed by means of a hardware processor, or may be executed and completed by using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory, and a decoding unit or processing unit reads information in the memory and completes the steps in the foregoing methods in combination with hardware of the decoding unit or processing unit.

It should be understood that in the embodiments, the processor may be a central processing unit ("CPU" for short), or the processor may be another general purpose processor, a digital signal processor (DSP), an application-specific integrated circuit (ASIC), a field programmable gate array (FPGA), or another programmable logical device, discrete gate or transistor logical device, discrete hardware component, or the like. The general purpose processor may be a microprocessor or the processor may be any conventional processor or the like.

In an implementation process, the steps in the foregoing methods may be completed by an integrated logic circuit of hardware in the processor or an instruction in a form of software. Steps of the methods disclosed with reference to the embodiments of the present invention may be directly executed and completed by means of a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor. To avoid repetition, details are not described herein again.

The data transmission device 600 according to this embodiment may be corresponding to the receiving device (the device C) in the method embodiment, and furthermore, units, that is, modules, in the data transmission device 600 and the foregoing other operations and/or functions are respectively intended to implement the corresponding procedures of the method 200 in FIG. 4, For brevity, details are not described herein again.

According to the data transmission device in this embodiment, when a transmitting device needs to transmit data to a target receiving device, the transmitting device selects, from a long training sequence set, a target long training sequence corresponding to the target receiving device, and adds the target long training sequence to a long training sequence field at a physical layer of a generated data packet, so that a receiving device can determine the target receiving device of the data packet according to the target long training sequence. Therefore, in a case in which the receiving device is not the target receiving device of the data packet, the receiving device does not need to continue to parse the data packet, which can reduce burden of the receiving device, reduce waste of hardware resources, and improve user experience.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
   determining, by a transmitting device, a long training sequence set, wherein the long training sequence set comprises a plurality of long training sequences;
   determining a mapping relationship between each long training sequence in the long training sequence set and first sub-identity information in identity information of each receiving device in a communications system, wherein one piece of identity information is used to uniquely indicate one receiving device in the communications system, and the first sub-identity information is a part or all of the identity information;
   selecting a target long training sequence from the long training sequence set corresponding to first sub-identity information of a target receiving device and according to the mapping relationship;
   performing encapsulation processing on data according to the target long training sequence to generate a data packet, so as to carry, in a long training sequence field at a physical layer of the data packet, a long training sequence symbol used to indicate the target long training sequence; and
   sending the data packet to the target receiving device, so that the target receiving device processes the data packet according to the target long training sequence after acquiring the target long training sequence from the data packet.

2. The method according to claim 1, wherein the target receiving device is a receiving device in the communications system, and wherein selecting the target long training sequence from the long training sequence set comprises:
   selecting, from the long training sequence set according to the first sub-identity information of the target receiving device and the mapping relationship, a second long training sequence corresponding to only the first sub-identity information of the target receiving device as the target long training sequence.

3. The method according to claim 2, wherein the first sub-identity information is a part of the identity information, and wherein performing encapsulation processing on the data comprises:
   performing encapsulation processing on the data according to the target long training sequence to generate the data packet, wherein a second sub-identity information symbol is carried at the physical layer of the data packet, wherein the second sub-identity information symbol is used to indicate second sub-identity information of the target receiving device, and the identity information comprises the second sub-identity information and the first sub-identity information.

4. The method according to claim 3, wherein the second sub-identity information symbol is carried in a partial association identifier field at the physical layer of the data packet.

5. The method according to claim 1, wherein the target receiving device is all receiving devices in the communications system, and the selecting a target long training sequence from the long training sequence set comprises:
   selecting, from the long training sequence set according to the first sub-identity information of the target receiving device and the mapping relationship, a third long training sequence corresponding to first sub-identity information of all the receiving devices in the communications system as the target long training sequence.

6. The method according to claim 1, wherein the long training sequence is a sequence with at least one of an autocorrelation property and a cross-correlation property.

7. The method according to claim 6, wherein the long training sequence comprises one of the following sequences:
   a polyphase perfect sequence, a Gold sequence, a Gold-like sequence, and a pseudo-random sequence.

8. The method according to claim 7, wherein the polyphase perfect sequence comprises one of the following sequences:
   a Zadoff-Chu sequence, a Frank sequence, and a Combined Frank/Zadoff-Chu sequence.

9. The method according to claim 6, wherein a length of the long training sequence is determined according to a quantity of available subcarriers in the communications system.

10. The method according to claim 1, wherein the identity information is one of the following types of information:
    a Media Access Control (MAC) address, an Internet Protocol (IP) address, a basic service set identifier (BSSID), association identity information (AID), a mobile phone number, an international mobile subscriber identity (IMSI), and an international mobile equipment identity (IMEI).

11. A method, comprising:
    determining, by a first receiving device of a plurality of receiving devices, a long training sequence set, wherein the long training sequence set comprises a plurality of long training sequences;
    determining a mapping relationship between each long training sequence in the long training sequence set and first sub-identity information in identity information of each receiving device of the plurality of receiving devices, wherein one piece of identity information is used to uniquely indicate one receiving device in the plurality of receiving devices, and the first sub-identity information is a part or all of the identity information;
    acquiring, in response to receiving a data packet transmitted by a transmitting device, a long training sequence symbol carried in a long training sequence field at a physical layer of the data packet, wherein the long training sequence symbol is used to indicate a target long training sequence, and the target long training sequence is selected by the transmitting device from the long training sequence set corresponding to first sub-identity information of a target receiving device of the data packet and according to the mapping relationship;

determining the target long training sequence according to the long training sequence symbol; and processing the data packet according to the target long training sequence.

12. The method according to claim 11, wherein the processing the data packet according to the target long training sequence comprises:

determining the first sub-identity information of the target receiving device of the data packet according to the target long training sequence and the mapping relationship; and processing the data packet according to a relationship between first sub-identity information of the first receiving device and the first sub-identity information of the target receiving device.

13. The method according to claim 11, wherein the processing the data packet according to the target long training sequence comprises:

determining, according to first sub-identity information of the first receiving device and the mapping relationship, a first long training sequence corresponding to only the first sub-identity information of the first receiving device from the long training sequence set; and processing the data packet according to a relationship between the target long training sequence and the first long training sequence.

14. An apparatus, comprising:

a processor;

a computer-readable storage medium storing a program to be executed by the processor, the program including instructions for:

determining a long training sequence set, wherein the long training sequence set comprises a plurality of long training sequences; and determining a mapping relationship between each long training sequence in the long training sequence set and first sub-identity information in identity information of each receiving device in a communications system, wherein one piece of identity information is used to uniquely indicate one receiving device in the communications system, and the first sub-identity information is a part or all of the identity information;

selecting, in response to data needing to be transmitted to a target receiving device, a target long training sequence from the long training sequence set corresponding to first sub-identity information of the target receiving device and according to the mapping relationship;

performing encapsulation processing on the data according to the target long training sequence to generate a data packet, so as to carry, in a long training sequence field at a physical layer of the data packet, a long training sequence symbol used to indicate the target long training sequence; and a transmitter coupled to the processor and configured to send the data packet to the target receiving device, so that the target receiving device processes the data packet according to the target long training sequence after acquiring the target long training sequence from the data packet.

15. The apparatus according to claim 14, wherein the target receiving device is one receiving device in the communications system, and the program further includes instructions for selecting, from the long training sequence set according to the first sub-identity information of the target receiving device and the mapping relationship, a second long training sequence corresponding to only the first sub-identity information of the target receiving device as the target long training sequence.

16. The apparatus according to claim 15, wherein the first sub-identity information is a part of the identity information, the program further includes instructions for performing encapsulation processing on the data according to the target long training sequence to generate the data packet, wherein a second sub-identity information symbol is carried at the physical layer of the data packet, wherein the second sub-identity information symbol is used to indicate second sub-identity information of the target receiving device, and the second sub-identity information belongs to a part of the identity information that is different from the first sub-identity information.

17. The apparatus according to claim 14, wherein the target receiving device is all receiving devices in the communications system, and the program further includes instructions for selecting, from the long training sequence set according to the first sub-identity information of the target receiving device and the mapping relationship, a third long training sequence corresponding to first sub-identity information of all the receiving devices in the communications system as the target long training sequence.

18. An apparatus, comprising:

a receiver, configured to receive a data packet transmitted by a transmitter;

a processor coupled to the receiver;

a computer-readable storage medium storing a program to be executed by the processor, the program including instructions for:

determining a long training sequence set, wherein the long training sequence set comprises at least two long training sequences;

determining a mapping relationship between each long training sequence in the long training sequence set and first sub-identity information in identity information of each receiving device in a communications system, wherein one piece of identity information is used to uniquely indicate one receiving device in the communications system, and the first sub-identity information is a part or all of the identity information;

acquiring a long training sequence symbol carried in a long training sequence field at a physical layer of the data packet, wherein the long training sequence symbol is used to indicate a target long training sequence, and the target long training sequence is selected by the transmitter from the long training sequence set corresponding to first sub-identity information of a target receiving device of the data packet and according to the mapping relationship;

determining the target long training sequence according to the long training sequence symbol; and processing the data packet according to the target long training sequence.

19. The apparatus according to claim 18, wherein the program further includes instructions for:

determining the first sub-identity information of the target receiving device of the data packet according to the target long training sequence and the mapping relationship; and processing the data packet according to a relationship between first sub-identity information of the apparatus and the first sub-identity information of the target receiving device.

20. The apparatus according to claim 18, wherein the program further includes instructions for:

determining, from the long training sequence set according to first sub-identity information of the apparatus and the mapping relationship, a first long training sequence corresponding to only the first sub-identity information of the apparatus; and processing the data packet according to a relationship between the target long training sequence and the first long training sequence.

* * * * *